(12) United States Patent
Fukui

(10) Patent No.: US 8,138,254 B2
(45) Date of Patent: Mar. 20, 2012

(54) THERMALLY CONDUCTIVE SILICONE RUBBER COMPOSITION

(75) Inventor: Hiroshi Fukui, Ichihara (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 594 days.

(21) Appl. No.: 11/909,932

(22) PCT Filed: Mar. 27, 2006

(86) PCT No.: PCT/JP2006/307001
§ 371 (c)(1),
(2), (4) Date: May 5, 2009

(87) PCT Pub. No.: WO2006/107004
PCT Pub. Date: Oct. 12, 2006

(65) Prior Publication Data
US 2009/0230348 A1    Sep. 17, 2009

(30) Foreign Application Priority Data

Mar. 30, 2005 (JP) .................................. 2005-098119

(51) Int. Cl.
C08G 77/08 (2006.01)
(52) U.S. Cl. ........................................ 524/430; 523/212
(58) Field of Classification Search .................. 524/430; 523/212
See application file for complete search history.

(56) References Cited

U.S. PATENT DOCUMENTS

| | | | |
|---|---|---|---|
| 4,604,424 A | 8/1986 | Cole et al. | |
| 5,008,307 A | 4/1991 | Inomata | |
| 5,021,494 A | 6/1991 | Toya | |
| 5,424,352 A * | 6/1995 | Watanabe | 524/433 |
| 5,492,945 A | 2/1996 | Morita et al. | |
| 5,618,631 A | 4/1997 | Meguriya et al. | |
| 5,645,941 A | 7/1997 | Meguriya et al. | |
| 5,714,265 A | 2/1998 | Meguriya et al. | |
| 5,859,127 A | 1/1999 | Nakano et al. | |
| 5,948,469 A | 9/1999 | Morita et al. | |
| 6,025,435 A | 2/2000 | Yamakawa et al. | |
| 6,040,362 A * | 3/2000 | Mine et al. | 523/212 |
| 6,235,862 B1 | 5/2001 | Isshiki et al. | |
| 6,306,957 B1 | 10/2001 | Nakano et al. | |
| 6,380,301 B1 | 4/2002 | Enami et al. | |
| 6,884,314 B2 * | 4/2005 | Cross et al. | 156/329 |
| 2002/0028335 A1 | 3/2002 | Fujiki et al. | |
| 2004/0254275 A1* | 12/2004 | Fukui et al. | 524/261 |
| 2006/0100336 A1* | 5/2006 | Fukui | 524/430 |

FOREIGN PATENT DOCUMENTS

| | | |
|---|---|---|
| EP | 0548969 A1 | 6/1993 |
| EP | 0661334 A1 | 7/1995 |
| EP | 0958805 A2 | 11/1999 |
| EP | 1002834 A1 | 5/2000 |
| EP | 1403326 A1 | 3/2004 |
| GB | 2279616 A | 1/1995 |
| JP | 61-157569 | 7/1986 |
| JP | 62-184058 | 8/1987 |
| JP | 63-251466 | 10/1988 |
| JP | 2041362 | 2/1990 |
| JP | 2097559 | 4/1990 |
| JP | 04-348143 | 12/1992 |
| JP | 07-102075 | 4/1995 |
| JP | 08-176447 | 7/1996 |
| JP | 08-325457 | 12/1996 |
| JP | 11-012546 | 1/1999 |
| JP | 2000-256558 | 9/2000 |
| JP | 2001-139815 | 5/2001 |
| JP | 2004-043814 | 2/2004 |
| JP | 2004-043815 | 2/2004 |
| WO | WO 02/097393 A3 | 12/2002 |
| WO | WO 2004/041938 A1 | 5/2004 |
| WO | WO 2004/061002 A1 | 7/2004 |
| WO | WO 2004/072181 A2 | 8/2004 |
| WO | WO 2005/021652 A1 | 3/2005 |

OTHER PUBLICATIONS

English language abstract for JP 2041362 extracted from espacenet.com database dated Feb. 23, 2008.
English language abstract for JP 2097559 extracted from espacenet.com database dated Feb. 23, 2008.
English language abstract for JP 4348143 extracted from espacenet.com.database dated Feb. 18, 2008.
English language abstract for JP 7102075 extracted from espacenet.com database dated Feb. 18, 2008.
English language abstract for JP 8325457 extracted from espacenet.com database dated Feb. 23, 2008.
English language abstract for JP 11012546 extracted from espacenet.com database dated Dec. 16, 2007.
English language abstract for JP 61157569 extracted from espacenet.com database dated Feb. 23, 2008.
English language abstract for JP 62184058 extracted from espacenet.com database dated Feb. 23, 2008.
English language abstract for JP 63251466 extracted from espacenet.com database dated Feb. 23, 2008.
English language abstract for JP 2000256558 extracted from espacenet.com database dated Oct. 25, 2007.

(Continued)

Primary Examiner — Margaret Moore
(74) Attorney, Agent, or Firm — Howard & Howard Attorneys PLLC

(57) ABSTRACT

A thermally conductive silicone rubber composition comprising: (A) an organopolysiloxane with the exception of below-given components (C) and (E); (B) a thermally conductive filler; (C) a specific organopolysiloxane; (D) a curing agent; (E) a resin-like organopolysiloxane; and (F) a silane compound showing no affinity to aforementioned component (A), wherein component (E) is contained in an amount of 2 to 10 mass % per sum of components (A) and (E), and wherein said component (F) is contained in an amount sufficient for coating 1 to 70% of the entire surface of component (B) determined from the contents of component (B) and the BET specific surface area of aforementioned component (B), demonstrates good handleability and possesses appropriate thixotropicity even when it contains a large amount of thermally conductive filler and when cured is capable of forming a thermally conductive silicone rubber characterized by good adhesive properties and elongation characteristics even without the use of a reinforcing filler.

19 Claims, 4 Drawing Sheets

OTHER PUBLICATIONS

English language abstract for JP 2001139815 extracted from espacenet.com database dated Oct. 25, 2007.
English language translation and abstract for JP08-176447 extracted from *Searching PAJ* database dated Dec. 9, 2007, 39 pages.
English language translation and abstract for JP2004-043814 extracted from *Searching PAJ* database dated Dec. 16, 2007, 79 pages.
English language translation and abstract for JP2004-043815 extracted from *Searching PAJ* database dated Dec. 9, 2007, 34 pages.
PCT International Search Report for PCT/JP2005/011864, Jan. 20, 2006, 5 pages.
PCT International Search Report for PCT/JP2005/018405, Mar. 22, 2006, 6 pages.
PCT International Search Report for PCT/JP2005/023444, Apr. 5, 2006, 3 pages.
PCT International Search Report for PCT/JP2005/306996, Jul. 18, 2006, 3 pages.
PCT International Search Report for PCT/JP2005/024196, Mar. 20, 2006, 3 pages.
Yongxin Han et al. "Silicon Directed *ipso*-Substitution of Polymer Bound Arylsilanes: Preparation of Biaryls via", Tetrahedron Letters, vol. 37, No. 16. 1996, pp. 2703-2706.
Schultz et al., "The Synthesis of Trimethylsilylmethoxymethyl Chloride", OPPI Briefs, vol. 27, No. 5, 1995, pp. 572-574.
Hojo et al., "New Access to Carbonyl Ylides by the Silicon-Based 1,3-Elimination and Their . . . ", Tetrahedron Letters, vol. 34, No. 37, 1993, pp. 5943-5946.
Boons et al., "Use of (Phenyldimethylsilyl)methoxymethyl and (Phenyldimethylsilyl)methyl ethers . . . ", Tetrahedron Letters, vol., 31, No. 15, 1990, pp. 2197-2200.
Hasseberg et al., "104. Synthese von Orellin", Helvetica Chimica Acta—vol, 71, No. 5, 1988, pp. 957-963.
Guedin-Vuong et al., "An Easy Access to Homopropargylic Ethers", Bulletin De La Societe Chimique De France, No. 2, 1986, pp. 245-252.
Pyne et al., "Chiral and Stereochemical Control via Intramolecular Diels-Alder Reaction of Z Dienes", J. American Chemical Society, vol. 104, No. 21, 1982, pp. 5719-5724.
Lipshutz et al., "B-(Trimethylylsilyl) Ethoxymethyl Chloride . . . ," Tetrahedron Letters, vol. 21, No. 35, 1980, pp. 3343-3346.
Shikhiev et al., "Synthesis and Reactions of Unsaturated Organosilicon Compounds", J. of General Chemistry of the USSR, vol. 41, No. 3, 1971, pp. 617-619.
Shipov et al., "Synthesis of Alkyl Chloromethyl Ethers", J. of General Chemistry of the USSR, vol. 59, No. 5.2, 1989, p. 1067.
Miramon et al., "Short Synthesis of Polyoxygenated Macrocyclic . . . ", Journal of Organic Chemistry, vol. 69, No. 20, 2004, pp. 6949-6952.
Shikhiev et al., "Synthesis and Reactions of Some Heteroorganic Ethers . . . ", J. of General Chemistry of the USSR, vol. 45, No. 1, 1975, pp. 91-93.

* cited by examiner

THERMALLY CONDUCTIVE SILICONE RUBBER COMPOSITION

RELATED APPLICATIONS

This application claims priority to and all the advantages of International Patent Application No. PCT/JP2006/307001, filed on Mar. 27, 2006, which claims priority to Japanese Patent Application No. JP2005-098119, filed on Mar. 30, 2005.

TECHNICAL FIELD

The present invention relates to a thermally conductive silicone rubber composition, in particular to a thermally conductive silicone rubber composition that demonstrates good handleability and possesses appropriate thixotropicity in spite of having a large content of thermally conductive filler and that demonstrates good adhesive properties and elongation and tensile strength in spite of the absence of reinforcing filler.

BACKGROUND ART

An increase in density and in the degree of integration of electronic elements such as transistors, integrated circuits, memory elements, or the like recently observed in the design of printed circuit boards and hybrid ICs are accompanied by the use of thermally conductive silicone rubber compositions that are characterized by more efficient heat radiation properties.

Such thermally conductive silicone rubber compositions may be exemplified by the following: a thermally conductive silicone rubber composition comprising an organopolysiloxane with vinyl groups, an organohydrogenpolysiloxane, a thermally conductive filler, aminosilane, an adhesion-imparting agent selected from epoxy silane or alkyltitanate, and a platinum-type catalyst (see Japanese Unexamined Patent Application Publication No. (hereinafter referred to as "Kokai") S61-157569); a thermally conductive silicone rubber composition comprising a diorganopolysiloxane that contains in one molecule an average of two alkenyl groups, an organopolysiloxane that has in one molecule an average of three or more silicon-bonded hydrogen atoms, a thermally conductive filler composed of zinc oxide and magnesium oxide, a surface-treating agent for a filler, and a platinum-type catalyst (see Kokai S62-184058); a thermally conductive silicone rubber composition comprising an organopolysiloxane that contains in one molecule at least 0.1 mole % of alkenyl groups, an organohydrogenpolysiloxane that contains in one molecule at least two silicon-bonded hydrogen atoms, a spherical alumina powder with an average particle size in the range of 10 to 50 μm and a spherical or aspherical alumina powder with an average particle size below 10 μm, and platinum or a platinum-type compound (see Kokai S63-251466); a thermally conductive silicone rubber composition comprising an organopolysiloxane with alkenyl groups, an organohydrogenpolysiloxane, an amorphous alumina powder with an average particle size in the range of 0.1 to 5 μm and a spherical alumina powder with an average particle size in the range of 5 to 50 μm, and a platinum-type catalyst (see Kokai H2-41362); and a thermally conductive silicone rubber composition comprising an organopolysiloxane having in one molecule at least two alkenyl groups, an organohydrogenpolysiloxane having in one molecule at least three silicon-bonded hydrogen atoms, a thermally conductive filler with an average particle size in the range of 5 to 20 μm, an adhesion-assisting agent, and a platinum or platinum-type catalyst (see Kokai H2-97559).

However, in order to improve thermal conductivity in a cured body obtained from such thermally conductive silicone rubber compositions, the latter must incorporate a large amount of a thermally conductive filler, but an increase in the amount of such a filler impairs handleability and moldability of the composition, and also worsens physical properties in products molded from such compositions. Another drawback is low adhesion of the composition to various substrates during curing.

In view of the above, it was proposed to improve handleability and moldability of a thermally conductive silicone rubber composition (1) by preparing this composition from an organopolysiloxane that contains in one molecule at least two alkenyl groups, an organohydrogenpolysiloxane that contains in one molecule at least two silicon-bonded hydrogen atoms, an organopolysiloxane that contains in one molecule at least one silicon-bonded alkoxy group or silicon-bonded hydroxyl group, a fine spherical or aspherical alumina powder with an average particle size below 10 μm and a fine spherical or aspherical alumina powder with an average particle size in the range of 10 to 50 μm, and a hydrosilylation catalyst (see Kokai H8-325457); (2) by preparing the composition from an organopolysiloxane, a methylpolysiloxane that contains a hydrolyzable group, a thermally conductive filler, and a curing agent (see Kokai 2000-256558); or (3) by preparing the composition from an organopolysiloxane, a curing agent, and a thermally conductive filler surface-treated with an oligosiloxane having silicon-bonded alkoxy groups (see Kokai 2001-139815).

However, when the thermally conductive compositions that are mentioned above incorporate a large amount of a thermally conductive filler such as alumina for improving thermal conductivity in a silicone rubber obtained by curing the composition, they become extremely viscous, difficult to handle and to mold, and therefore cannot be applied satisfactorily for use, e.g., in stencil printing. Other problems associated with the aforementioned compositions are decrease in adhesive properties, elongation characteristics, and tensile strength of the silicone rubber obtained by curing the composition. On the other hand, in order to improve the adhesive properties, elongation characteristics, and tensile strength of silicone rubber, the latter should be combined with a reinforcing filler, but an addition of the reinforcing filler adversely affects thermal conductivity of the silicone rubber.

It is an object of the present invention to provide a thermally conductive silicone rubber composition that demonstrates good handleability and possesses appropriate thixotropicity even in the presence of a large amount of a thermally conductive filler and that, when cured, produces a thermally conductive silicone rubber characterized by high tensile strength and improved adhesion and elongation characteristics even without the use of a reinforcing filler.

DISCLOSURE OF INVENTION

The thermally conductive silicone rubber composition of the present invention comprises:

(A) an organopolysiloxane with the exception of below-given components (C) and (E);

(B) a thermally conductive filler;
(C) a composition selected from
  (i) an organopolysiloxane represented by the following general formula:

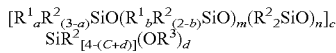

(wherein $R^1$ is a univalent hydrocarbon group with an aliphatic, unsaturated bonds, $R^2$ may designate the same or different univalent hydrocarbon groups that do not have aliphatic, unsaturated bonds, $R^3$ designates an alkyl group, alkoxyalkyl group, alkenyl group, or an acyl group; "a" is an integer between 0 and 3, "b" is 1 or 2, "c" is an integer between 1 and 3, "d" is an integer between 1 and 3; "(c+d)" is an integer between 2 and 4, "m" is an integer that is equal to or greater than 0, and "n" is an integer that is equal to or greater than 0; when "a" is 0, then "m" is an integer that is equal to or greater than 1);
  (ii) an organopolysiloxane represented by the following general formula:

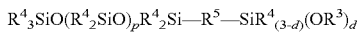

(wherein $R^3$ is the same defined above, $R^4$ represents the same or different univalent hydrocarbon groups, $R^5$ represents an oxygen atom or a bivalent hydrocarbon group, "p" is an integer between 100 and 500, and "d" is the same defined above); or
  (iii) a mixture of two or more of the above constituents (i) and (ii);
(D) a curing agent;
(E) an organopolysiloxane composed of the following units: $SiO_{4/2}$, $R^1R^2{}_2SiO_{1/2}$, and $R^2{}_3SiO_{1/2}$ (wherein $R^1$ and $R^2$ are the same as defined above); and
(F) a silane compound represented by the following general formula:

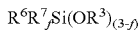

{wherein $R^3$ is the same as defined above; $R^6$ is a substituents showing no affinity with respect to aforementioned component (A); $R^7$ is an alkyl group; "f" is 0 or 1},
wherein component (E) is contained in an amount of 2 to 10 mass % per sum of components (A) and (E), and wherein said component (F) is contained in an amount sufficient for coating 1 to 70% of the entire surface of component (B) determined from the contents of component (B) and the BET specific surface area of aforementioned component (B).

EFFECTS OF INVENTION

The effects of the invention consist of the fact that the proposed thermally conductive silicone rubber composition demonstrates good handleability and possesses appropriate thixotropicity even in the presence of a large amount of a thermally conductive filler and that, when the composition is cured, produces a thermally conductive silicone rubber characterized by high tensile strength and improved adhesion and elongation characteristics even without the use of a reinforcing filler.

DETAILED DESCRIPTION OF THE INVENTION

Figure 1:
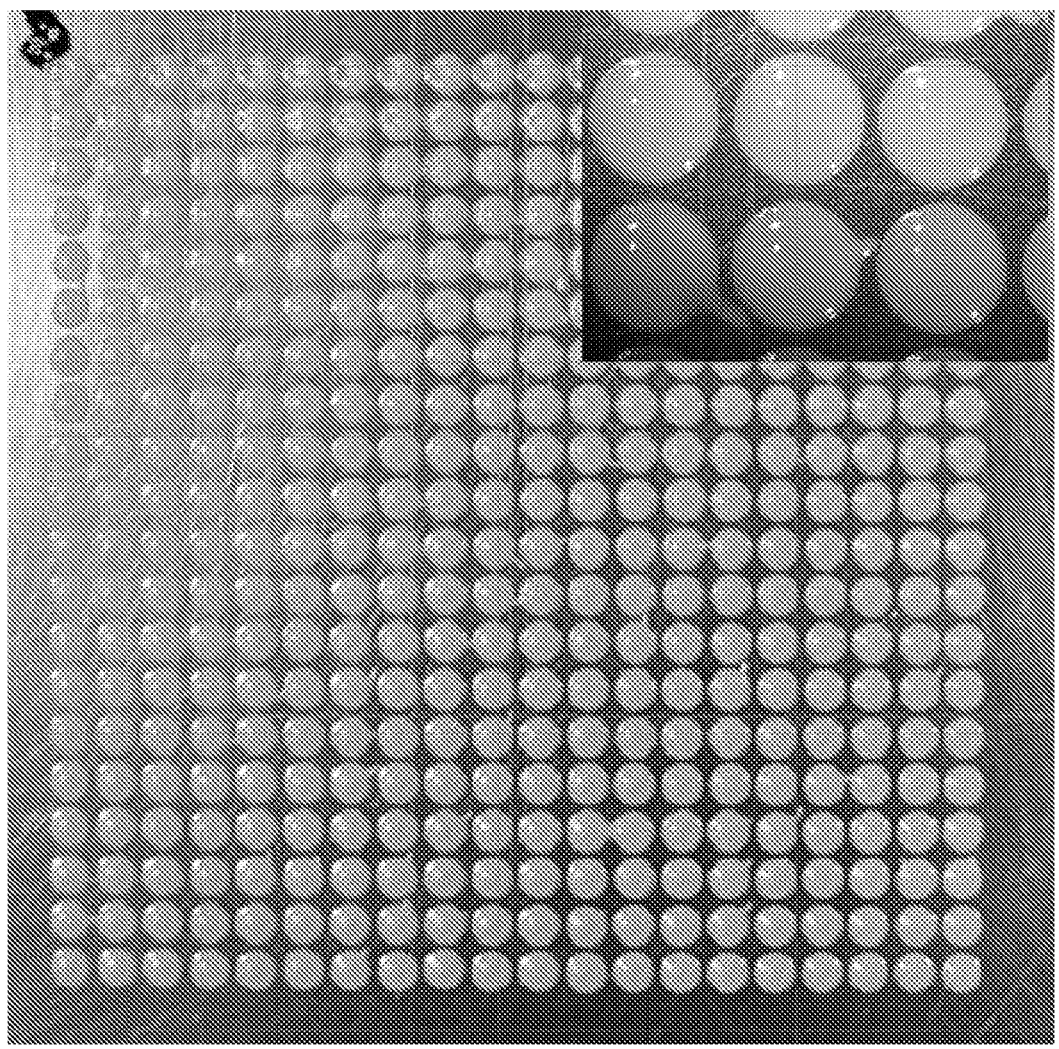
FIG. 1 is a typical photo image illustrating conditions after stencil printing with the use of the thermally conductive silicone rubber composition prepared in Practical Example 1.
Figure 2:
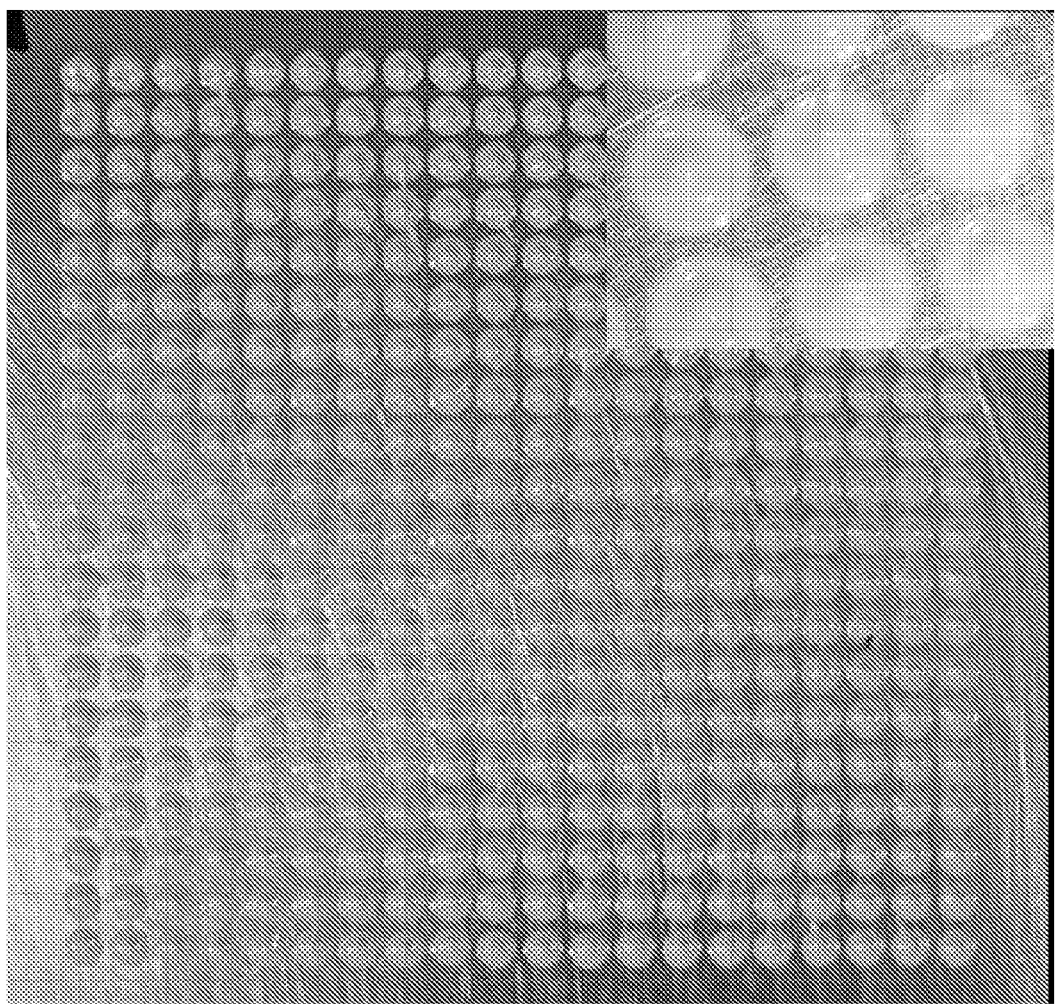
FIG. 2 is a typical photo image illustrating conditions after stencil printing with the use of the thermally conductive silicone rubber composition prepared in Practical Example 2.
Figure 3:
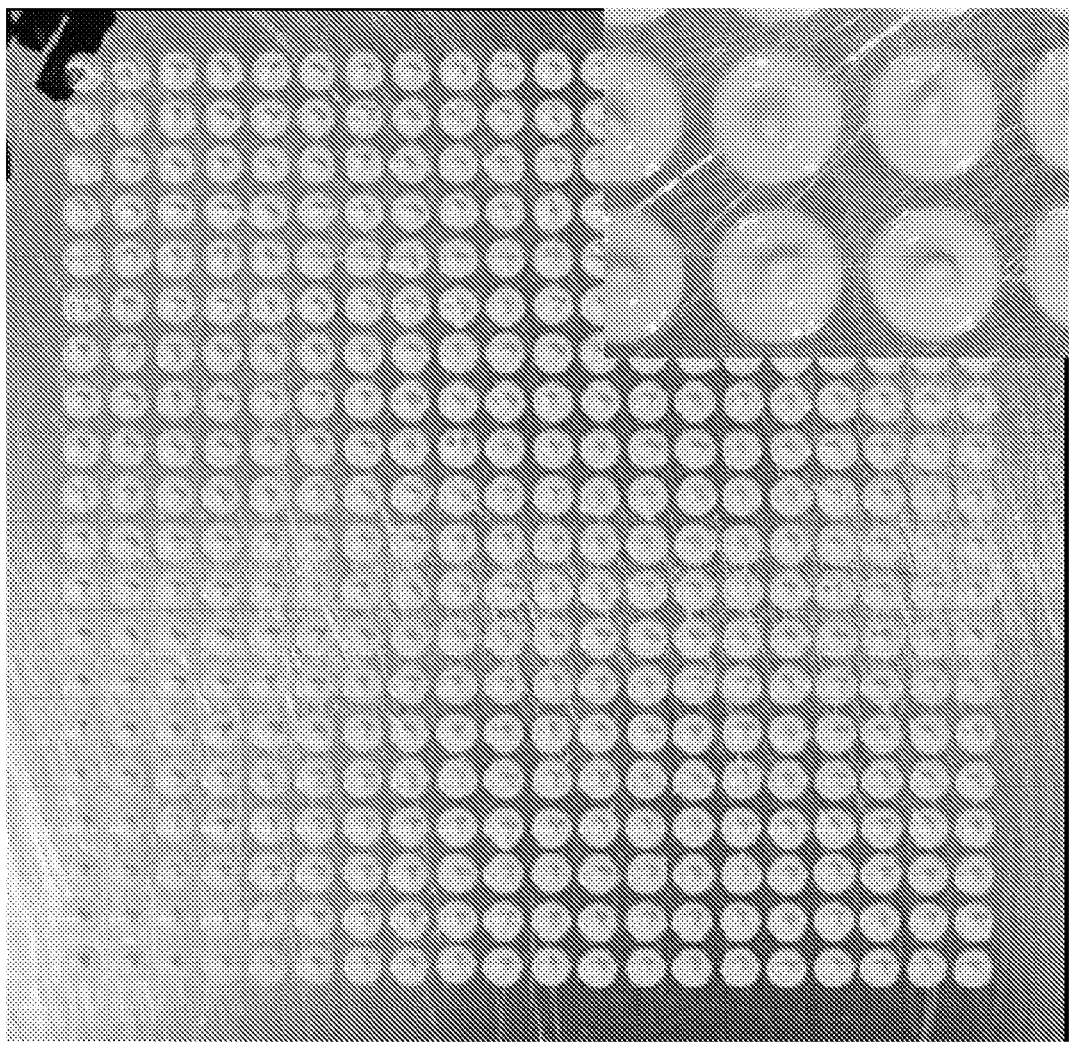
FIG. 3 is a typical photo image illustrating conditions after stencil printing with the use of the thermally conductive silicone rubber composition prepared in Practical Example 3.
Figure 4:
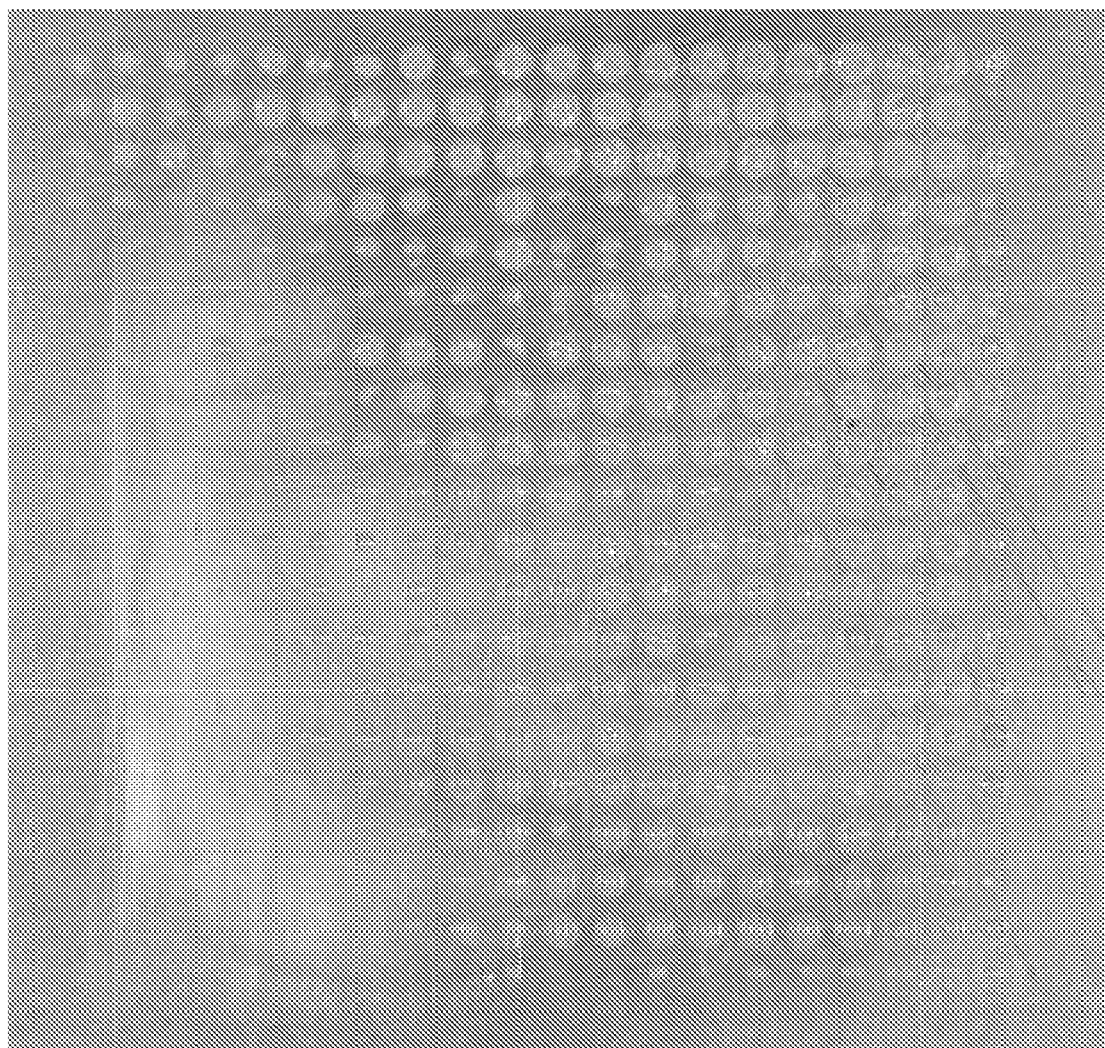
FIG. 4 is a typical photo image illustrating conditions after stencil printing with the use of the thermally conductive silicone rubber composition prepared in Comparative Example 1.

The composition of the invention is characterized by comprising Components (A) through (F). There are no special restrictions with regard to the curing mechanism of the composition, and the composition can be cured by means of a hydrosilylation reaction, condensation reaction, or free-radical reaction with the use of organic peroxide. The most preferable is a hydrosilylation reaction since it provides quick curing and does not generate byproducts.

Component (A) is one of the main components of the composition, and it may be comprised of an organopolysiloxane other than those relating to the below-described Components (C) and (E). Examples of silicon-bonded groups contained in Component (A) are the following: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or similar linear-chain alkyl groups; isopropyl, tertiarybutyl, isobutyl, 2-methylundecyl, 1-hexylheptyl, or similar branched-chain alkyl groups; cyclopentyl, cyclohexyl, cyclododecyl, or similar cyclic alkyl groups; vinyl, allyl, butenyl, pentenyl, hexenyl, or similar alkenyl groups; phenyl, tolyl, xylyl, or similar aryl groups; benzyl, phenethyl, 2-(2,4,6,-trimethylphenyl)propyl, or similar aralkyl groups; 3,3,3-trifluoropropyl, 3-chloropropyl, or similar halogenated alkyl groups; silicon-bonded hydrolyzable groups; hydroxy groups (silanol groups). Most preferable of the above are alkyl, alkenyl, and aryl groups, especially methyl, vinyl, and phenyl groups. There are no special restrictions with regard to the viscosity of Component (A) at 25° C., but it is recommended that the viscosity be within the range of 20 to 100,000 mPa·s, preferably within the range of 50 to 100,000 mPa·s, more preferably within the range of 50 to 50,000 mPa·s, and most preferably within the range of 100 to 50,000 mPa·s. If the viscosity at 25° C. is below the recommended lower limit, this will noticeably impair physical properties of the obtained silicone rubber. If, on the other hand, the viscosity exceeds the recommended upper limit, this will worsen handleability of the silicone rubber composition. There are no special restrictions with regard to the molecular structure of Component (A), and this component may have a linear, branched, partially branched linear or dendritic (dendrimer) molecular structure. Component (A) with the aforementioned molecular structure may be in the form of a simple polymer, a copolymer, or a mixture of polymers. Most preferable is an organopolysiloxane with a linear or partially branched linear molecular structure that does not contain silicon-bonded alkoxy groups.

Component (A) can be exemplified by the following compounds: dimethylpolysiloxane capped at both molecular terminals with dimethylvinylsiloxy groups, dimethylpolysiloxane capped at both molecular terminals with methylphenylvinylsiloxy groups, a copolymer of methylphenylsiloxane and dimethylsiloxane capped at both molecular terminals with dimethylvinylsiloxy groups; a copolymer of methylvinylsiloxane and dimethylsiloxane capped at both molecular terminals with dimethylvinylsiloxy groups, a copolymer of methylvinylsiloxane and dimethylsiloxane capped at both molecular terminals with trimethylsiloxy groups, methyl (3,3,3-trifluoropropyl) polysiloxane capped at both molecular terminals with dimethylvinylsiloxy groups; a copolymer of methylvinylsiloxane and dimethylsiloxane capped at both molecular terminals with silanol groups; a copolymer of methylphenylsiloxane, methylvinylsiloxane, and dimethylsiloxane capped at both molecular terminals with silanol groups; an organosiloxane copolymer composed of siloxane units represented by the following siloxane unit formulas: $(CH_3)_3SiO_{1/2}$, $(CH_2)_2(CH_2=CH)SiO_{1/2}$, $CH_3SiO_{3/2}$ and $(CH_2)_2SiO_{2/2}$; dimethylpolysiloxane capped at both molecular terminals with silanol groups; a copolymer of methylphenylsiloxane and dimethylsiloxane capped at both molecular terminals with silanol groups; dimethylpolysiloxane capped at both molecular terminals with trimethoxysiloxy groups; a copolymer of methylphenylsiloxane and dimethylsiloxane capped at both molecular terminals with trimethoxysiloxy groups; dimethylpolysiloxane capped at both molecular terminals with methyldimethoxysiloxy groups; dimethylpolysiloxane capped at both molecular terminals with triethoxysiloxy groups; dimethylpolysiloxane capped at both molecular terminals with trimethoxysilylethyl groups; or mixtures of two or more of the above.

When the composition of the invention is cured by a hydrosilylation reaction, it is recommended that Component (A) be comprised of an organopolysiloxane with an average of 0.1 or more alkenyl groups in one molecule, preferably an organopolysiloxane that contains in one molecule on average more than 0.5 alkenyl groups, and even more preferably an organopolysiloxane that contains in one molecule on average more than 0.8 alkenyl groups. If the average amount of alkenyl groups in one molecule is below the recommended lower limit, it will be impossible to provide complete curing of the obtained silicone rubber composition. The alkenyl groups that are contained in such organopolysiloxanes are the same as exemplified above, of which vinyl groups are most preferable. Silicon-bonded groups other than alkenyl groups that may be contained in the aforementioned organopolysiloxanes may be the same linear-chain alkyl groups, branched-chain alkyl groups, cyclic alkyl groups, aryl groups, aralkyl groups, and halogenated alkyl groups that have been mentioned above. Most preferable of these are alkyl groups, aryl groups, and especially methyl and phenyl groups. There are no special restrictions with regard to the viscosity of the aforementioned organopolysiloxanes at 25° C., but it may be recommended that the viscosity be within the range of 20 to 100,000 mPa·s, preferably within the range of 50 to 100,000 mPa·s, more preferably within the range of 50 to 50,000 mPa·s, and most preferably within the range of 100 to 50,000 mPa·s. If the viscosity is below the recommended lower limit, this will impair physical properties of the obtained silicone rubber, and if the viscosity exceeds the recommended upper limit, this will noticeably impair handleability of the obtained silicone rubber composition. There are no limitations with regard to the molecular structure of the aforementioned organopolysiloxanes, but preferably it should have a linear or a partially branched linear molecular structure. The aforementioned organopolysiloxanes may be exemplified by the same organopolysiloxanes with alkenyl groups that have been mentioned earlier.

When the composition of the present invention is curable by a condensation reaction, it is recommended to use as Component (A) an organopolysiloxane that contains in one molecule at least two silanol groups or a silicon-bonded hydrolyzable group. The silicon-bonded hydrolyzable groups of such organopolysiloxane may be represented, e.g., by methoxy, ethoxy, propoxy, or similar alkoxy groups; vinyloxy, propenoxy, isopropenoxy, 1-ethyl-2-methylvinyloxy, or similar alkenoxy groups; methoxyethoxy, ethoxyethoxy, methoxypropoxy, or similar alkoxyalkoxy groups; acetoxy, octanoyloxy, or similar acyloxy groups; dimethylketoxime, methylethylketoxime or similar ketoxime groups; dimethylamino, diethylamino, butylamino, or similar amino groups; dimethylaminoxy, diethylaminoxy, or similar aminoxy groups; N-methylacetoamide, N-ethylacetoamide, or similar amide groups. Silicon-bonded groups other than the silanol and silicon-bonded hydrolyzable groups of the aforementioned organopolysiloxanes may be exemplified by the same linear-chained alkyl groups, branch-chained alkyl groups, cyclic alkyl groups, alkenyl groups, aryl groups, aralkyl groups, and halogenated alkyl groups that have been mentioned earlier. There are no special restrictions with regard to the viscosity of the aforementioned organopolysiloxanes at 25° C., but it may be recommended that the viscosity be within the range of 20 to 100,000 mPa·s, preferably within the range of 50 to 100,000 mPa·s, and most preferably within the range of 100 to 100,000 mPa·s. If the viscosity is below the recommended lower limit, this will impair physical properties of the obtained silicone rubber, and if the viscosity exceeds the recommended upper limit, this will noticeably impair handleability of the obtained silicone rubber composition. There are no limitations with regard to the molecular structure of the aforementioned organopolysiloxanes, but preferably it should have a linear or a partially branched linear molecular structure. The aforementioned organopolysiloxanes may be the same organopolysiloxanes with at least two silanol groups or a silicon-bonded hydrolyzable group in one molecule as exemplified earlier.

There are no special restrictions with regard to the organopolysiloxane that can be used as Component (A) in the composition of the present invention that is curable by a free-radical reaction with the use of an organic peroxide, but the preferable one is an organopolysiloxane that contains at least one alkenyl group in one molecule. The silicon-bonded groups contained in such organopolysiloxanes may be the same linear-chain alkyl groups, branched-chain alkyl groups, cyclic alkyl groups, alkenyl groups, aryl groups, aralkyl groups, and halogenated alkyl groups that have been mentioned earlier. Most preferable of these are alkyl groups, alkenyl groups, and aryl groups, especially methyl, vinyl, and phenyl groups. There are no special restrictions with regard to the viscosity of the aforementioned organopolysiloxanes at 25° C., but it may be recommended that the viscosity be within the range of 20 to 100,000 mPa·s, preferably within the range of 50 to 100,000 mPa·s, more preferably within the range of 50 to 50,000 mPa·s, and even more preferably within the range of 100 to 50,000 mPa·s. If the viscosity is below the recommended lower limit, this will impair physical properties of the obtained silicone rubber, and if the viscosity exceeds the recommended upper limit, this will noticeably impair handleability of the obtained silicone rubber composition. There are no limitations with regard to the molecular structure of the aforementioned organopolysiloxanes, and they may have the same molecular structures as mentioned earlier, preferably a linear and a partially branched linear molecular structures. The aforementioned organopolysiloxanes may be the same organopolysiloxanes that have been exemplified earlier.

Component (B) is a thermally conductive filler that is used to impart thermal conductivity to silicone rubber obtained by curing the composition of the invention. Examples of this thermoconductive filler are the following: aluminum powder, copper powder, nickel powder, or a similar metal powder; alumina powder, magnesium oxide powder, beryllium oxide powder, chromium oxide powder, titanium oxide powder, or a similar metal oxide powder; boron nitride powder, aluminum nitride powder, or a similar metal nitride powder; boron carbide powder, titanium carbide powder, silicon carbide powder, or a similar metal carbide powder; a metal oxide powder surface-coated with metal for acquiring electrical conductivity; or mixtures of two or more of the powders mentioned above. Furthermore, regarding the shape of the powder particles, Component (B) powders may have spherical, needle-shaped, disc-shaped, cylinder-shaped, or irregular-shaped particles. When it is required that the composition of the invention or the silicone rubber obtained by curing the composition possesses electric insulating properties, then it is preferable to use Component (B) in the form of metal oxide powders, metal nitride powders, or metal carbide powders, and preferably alumina powders. There are no special restrictions with regard to the average particle size of Component (B), but it may be recommended that the particle size be within the range of 0.1 to 100 μm, and preferably within the range of 0.1 to 50 μm. The most preferable is an alumina powder with BET-specific surface area not exceeding 5.0 $m^2/g$. When the thermally conductive filler of Component (B) is an alumina powder, it may be comprised of a mixture of spherical alumina powder ($B_1$) with an average particle size in the range of 1 to 30 μm (excluding 1 μm particles) and spherical alumina powder or irregular-shaped alumina powder ($B_2$) with an average particle size in the range of 0.1 to 5 μm. In such a mixture, it is preferable that the content of constituents ($B_1$) be within the range of 30 to 90 mass % and the content of constituent ($B_2$) within the range of 10 to 70 mass %.

There are no special limitations with regard to the amount in which Component (B) can be added to the composition of the invention. For example, in order to mold silicone rubber with improved thermal conductivity, in terms of vol. %, the composition may contain Component (B) in an amount of at least 30 vol. %, preferably 30 to 90 vol. %, more preferably 40 to 90 vol. %, and even more preferably 50 to 90 vol. %. In particular, in the most preferable proportions required for obtaining silicone rubber with improved thermal conductivity, the amount of Component (B) in terms of mass % in the composition of the invention should be no less than 60 mass %, preferably within the range of 70 to 98 mass %, and more preferably within the range of 80 to 97 mass %. More specifically, Component (B) can be added to the composition in an amount of 300 to 2,500 parts by mass, preferably 400 to 2,000 parts by mass, and even more preferably 500 to 2,000 parts by mass per 100 parts by mass of Component (A). If the added amount of Component (B) is below the recommended lower limit, the obtained silicone rubber will not acquire sufficient thermal conductivity. If, on the other hand, the added amount of Component (B) exceeds the recommended upper limit, the viscosity of the obtained silicone rubber composition will be too high, and therefore it will be difficult to provide uniform dispersion of Component (B) in the obtained silicone rubber composition. This will either impede handling of the composition or will impair the physical properties in the silicone rubber obtained from the composition.

Component (C) is used for obtaining a thermally conductive silicone composition that possesses high thermal conductivity and good handleability even if it contains a large amount of thermoconductive filler of Component (B). This component may be selected from;
(i) an organopolysiloxane represented by the following general formula:

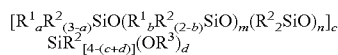

(wherein $R^1$ is a univalent hydrocarbon group having an aliphatic, unsaturated bond, $R^2$ may designate the same or different univalent hydrocarbon groups that do not have aliphatic, unsaturated bonds, $R^3$ designates an alkyl group, alkoxyalkyl group, alkenyl group, or an acyl group; "a" is an integer between 0 and 3, "b" is 1 or 2, "c" is an integer between 1 and 3, "d" is an integer between 1 and 3; "(c+d)" is an integer between 2 and 4, "m" is an integer that is equal to or greater than 0, and "n" is an integer that is equal to or greater than 0; when "a" is 0, then "m" is an integer that is equal to or greater than 1);
(ii) an organopolysiloxane represented by the following general formula:

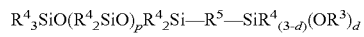

(wherein $R^3$ is the same defined above, $R^4$ represents the same or different univalent hydrocarbon groups, $R^5$ represents oxygen atoms or bivalent hydrocarbon groups, "p" is an integer between 100 and 500, and "d" is the same defined above); or
(iii) a mixture of two or more of the above constituents (i) and (ii).

Even if the aforementioned constituent (i), which is added for obtaining silicone rubber of high thermal conductivity, is used in the thermal conductive filler of Component (B) in a large quantity, this will not impair handleability or moldability of the composition, and when the composition possesses curability, this constituent imparts to the composition good adhesion to various substrates during curing. The constituent (i) is represented by the following general formula:

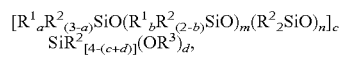

wherein $R^1$ is a univalent hydrocarbon group that contains aliphatic, unsaturated bonds. Examples of such groups are the following: vinyl, allyl, butenyl, hexenyl, decenyl, undecenyl, dodecenyl, tridecenyl, tetradecenyl, pentadecenyl, hexadecenyl, heptadecenyl, octadecenyl, nonadecenyl, eicosenyl, or similar linear-chain alkenyl groups; isopropenyl, 2-methyl-2-propenyl, 2-methyl-10-undecenyl, or similar branched-chain alkenyl groups; vinylcyclohexyl, vinylcyclododecyl, or similar cyclic alkyl groups that contain aliphatic, unsaturated bonds; vinylphenyl or similar aryl groups that contain aliphatic, unsaturated bonds; vinylbenzyl, vinylphenethyl, or similar aralkyl groups that contain aliphatic, unsaturated bonds. Most preferable of the above are linear-chain alkenyl groups, in particular, vinyl, allyl, or hexenyl groups. There are no special restrictions with regard to the position of the aliphatic, unsaturated bonds in $R^1$, but it is preferable to locate them remotely from the bonding silicon atom. In the above formula, $R^2$ may represent similar or different univalent hydrocarbon groups that do not contain aliphatic, unsaturated bonds. These groups may be the same linear-chain alkyl groups, branched-chain alkyl groups, cyclic alkyl groups, aryl groups, aralkyl groups, or halogenated alkyl groups that have been exemplified above. Most preferable of these groups are alkyl and aryl groups, and even more preferable are alkyl groups having one to four carbon atoms, in particular, methyl and ethyl groups. In the above formula, $R^3$ is an alkyl group, alkoxyalkyl group, alkenyl group, or acyl group. $R^3$ as an alkyl group can be represented by the same linear-chain alkyl groups, branched-chain alkyl groups, or cyclic alkyl groups that have been given above. Linear-chain alkyl groups are more preferable, especially groups such as methyl, ethyl, or propyl groups. $R^3$ as an alkoxyalkyl group may be exemplified by methoxyethoxy, ethoxyethoxy, or methoxypropoxy groups, of which methoxyethoxy groups are most preferable. $R^3$ as alkenyl groups may be the same alkenyl groups that have been exemplified above, and preferably be comprised of isopropenyl groups. $R^3$ as acyl groups may be comprised, e.g., of acetoxy groups. In the above formula, "a" is an integer between 0 and 3, and preferably 1; "b" is 1 or 2, and preferably 1; "c" is an integer between 1 and 3, and preferable 1; "d" is an integer between 1 and 3, and preferably 3; and "(c+d)" is an integer between 2 and 4; "m" is an integer equal to or greater than 0. When the aforementioned "a" is 0, then "m" in the above formula is an integer equal to or greater than 1. It is preferable that "m" be an integer between 0 and 500, preferably between 1 and 500, more preferably between 5 and 500, and even more preferably between 10 and 500, and most preferably between 10 and 200. In the above formula, "n" is an integer equal to or greater than 0, preferably between 0 and 500, even more preferably between 1 and 500, still further preferably between 5 and 500, even more preferably between 10 and 500, and most preferably between 10 and 200.

The aforementioned organopolysiloxane of constituent (i) can be prepared, e.g., by conducting an alkoxy-exchange reaction between an organosiloxane which is represented by the following formula:

$$[R^1{}_aR^2{}_{(3-a)}SiO(R^1{}_bR^2{}_{(2-b)}SiO)_m(R^2{}_2SiO)_n]H,$$

and is capped at one molecular terminal with silanol groups and an alkoxysilane compound that contains in one molecule at least two silicon-bonded alkoxy groups, the reaction being carried out in the presence of acetic acid or a similar acidic catalyst. In the above formula of the aforementioned silanol-capped organosiloxane, $R^1$ and $R^2$ are the same groups as defined above; "a", "b", "m", and "n" are also the same integers as defined earlier. On the other hand, the aforementioned alkoxysilane compound that contains in one molecule at least two silicon-bonded alkoxy groups is represented by the following general formula:

$$R^2{}_{(4-g)}Si(OR^3)_g.$$

In the formula of the alkoxysilane compound, $R^2$ and $R^3$ are the same as defined earlier, and "g" is an integer between 2 and 4, preferably 4. The aforementioned alkoxysilane compound can be exemplified by dimethoxydimethylsilane, dimethoxydiethylsilane, diethoxydimethylsilane, diethoxydiethylsilane, or a similar dialkoxydialkylsilane compound; trimethoxymethylsilane, triethoxyethylsilane, trimethoxypropylsilane, triethoxymethylsilane, triethoxyethylsilane, or a similar trialkoxyalkylsilane compound; tetramethoxysilane, tetraethyoxysilane, tetrapropoxysilane, or a similar tetraalkoxysilane compound. The acidic catalyst may be represented by, e.g., acetic acid, propionic acid, or a similar fatty acid.

The organopolysiloxanes of constituent (i) may be exemplified by compounds represented by the following formulas:

$(CH_2=CH)(CH_3)_2SiO[(CH_3)_2SiO]_5Si(OCH_3)_3$ $(CH_2=CHCH_2)(CH_3)_2SiO[(CH_3)_2SiO]_5Si(OCH_3)_3$ $(CH_2=CHCH_2CH_2CH_2CH_2)(CH_3)_2SiO[(CH_3)_2SiO]_5Si(OCH_3)_3$ $(CH_2=CH)(CH_3)_2SiO[(CH_3)_2SiO]_7Si(OCH_3)_3$ $(CH_2=CH)(CH_3)_2SiO[(CH_3)_2SiO]_7Si(OC_2H_5)_3$ $(CH_2=CHCH_2)(CH_3)_2SiO[(CH_3)_2SiO]_7Si(OCH_3)_3$ $(CH_2=CHCH_2CH_2CH_2CH_2)(CH_3)_2SiO[(CH_3)_2SiO]_7Si(OCH_3)_3$ $(CH_2=CH)(CH_3)_2SiO[(CH_3)_2SiO]_7SiCH_3(OCH_3)_2$ $(CH_2=CH)(CH_3)_2SiO[(CH_3)_2SiO]_7SiCH_3(OCH_3)_2$ $(CH_2=CH)(CH_3)_2SiO[(CH_3)_2SiO]_{25}Si(OCH_3)_3$ $(CH_2=CHCH_2)(CH_3)_2SiO[(CH_3)_2SiO]_{25}Si(OCH_3)_3$ $(CH_2=CHCH_2CH_2CH_2CH_2)(CH_3)_2SiO[(CH_3)_2SiO]_{25}Si(OCH_3)_3$ $(CH_2=CH)(CH_3)_2SiO[(CH_3)_2SiO]_{25}Si(OC_2H_5)_3$ $(CH_2=CH)(CH_3)_2SiO[(CH_3)_2SiO]_{25}SiCH_3(OCH_3)_2$ $(CH_2=CH)(CH_3)_2SiO[(CH_3)_2SiO]_{50}Si(OCH_3)_3$ $(CH_2=CHCH_2)(CH_3)_2SiO[(CH_3)_2SiO]_{50}Si(OCH_3)_3$ $(CH_2=CHCH_2CH_2CH_2CH_2)(CH_3)_2SiO[(CH_3)_2SiO]_{50}Si(OCH_3)_3$ $(CH_2=CH)(CH_3)_2SiO[(CH_3)_2SiO]_{50}Si(OC_2H_5)_3$ $(CH_2=CH)(CH_3)_2SiO[(CH_3)_2SiO]_{50}SiCH_3(OCH_3)_2$ $\{(CH_3)_3SiO[(CH_2=CH)(CH_3)SiO]_1[(CH_3)_2SiO]_4\}Si(OCH_3)_3$ $\{(CH_3)_3SiO[(CH_2=CH)_2SiO]_1[(CH_3)_2SiO]_4\}Si(OCH_3)_3$ $\{(CH_3)_3SiO[(CH_2=CH)(CH_3)SiO]_1[(CH_3)_2SiO]_4\}Si(OC_2H_5)_3$ $\{(CH_2=CH)(CH_3)_2SiO[(CH_2=CH)(CH_3)SiO]_1[(CH_3)_2SiO]_4\}Si(OCH_3)_3$ $\{(CH_2=CH)(CH_3)_2SiO[(CH_2=CH)_2SiO]_1[(CH_3)_2SiO]_4\}Si(OCH_3)_3$ $\{(CH_2=CH)(CH_3)_2SiO[(CH_2=CH)(CH_3)SiO]_1[(CH_3)_2SiO]_4\}Si(OC_2H_5)_3$ $\{(CH_3)_3SiO[(CH_2=CHCH_2)(CH_3)SiO]_1[(CH_3)_2SiO]_4\}Si(OCH_3)_3$ $\{(CH_3)_3SiO[(CH_2=CHCH_2)_2SiO]_1[(CH_3)_2SiO]_4\}Si(OCH_3)_3$ $\{(CH_2=CHCH_2)(CH_3)_2SiO[(CH_2=CH)(CH_3)SiO]_1[(CH_3)_2SiO]_4\}Si(OCH_3)_3$ $\{(CH_2=CHCH_2)(CH_3)_2SiO[(CH_2=CHCH_2)(CH_3)SiO]_1[(CH_3)_2SiO]_4\}Si(OCH_3)_3$ $\{(CH_3)_3SiO[(CH_2=CHCH_2CH_2CH_2CH_2)(CH_3)SiO]_1[(CH_3)_2SiO]_4\}Si(OCH_3)_3$ $\{(CH_2=CHCH_2CH_2CH_2CH_2)(CH_3)_2SiO[(CH_2=CH)(CH_3)SiO]_1[(CH_3)_2SiO]_4\}Si(OCH_3)_3$ $\{(CH_2=CHCH_2CH_2CH_2CH_2)(CH_3)_2SiO[(CH_2=CHCH_2CH_2CH_2CH_2)(CH_3)SiO]_1[(CH_3)_2SiO]_4\}Si(OCH_3)_3$ $\{(CH_3)_3SiO[(CH_2=CH)(CH_3)SiO]_2[(CH_3)_2SiO]_{10}\}Si(OCH_3)_3$ $\{(CH_3)_3SiO[(CH_2=CH)_2SiO]_2[(CH_3)_2SiO]_{10}\}Si(OCH_3)_3$ $\{(CH_3)_3SiO[(CH_2=CH)(CH_3)SiO]_2[(CH_3)_2SiO]_{10}\}Si(OC_2H_5)_3$ $\{(CH_2=CH)(CH_3)_2SiO[(CH_2=CH)(CH_3)SiO]_2[(CH_3)_2SiO]_{10}\}Si(OCH_3)_3$

{(CH$_2$=CH)(CH$_3$)$_2$SiO[(CH$_2$=CH)$_2$SiO]$_2$[(CH$_3$)$_2$SiO]$_{10}$}Si(OCH$_3$)$_3$

{(CH$_2$=CH)(CH$_3$)$_2$SiO[(CH$_2$=CH)(CH$_3$)SiO]$_2$[(CH$_3$)$_2$SiO]$_{10}$}Si(OC$_2$H$_5$)$_3$

{(CH$_3$)$_3$SiO[(CH$_2$=CHCH$_2$)(CH$_3$)SiO]$_2$[(CH$_3$)$_2$SiO]$_{10}$}Si(OCH$_3$)$_3$

{(CH$_3$)$_3$SiO[(CH$_2$=CHCH$_2$)$_2$SiO]$_2$[(CH$_3$)$_2$SiO]$_{10}$}Si(OCH$_3$)$_3$

{(CH$_2$=CHCH$_2$)(CH$_3$)$_2$SiO[(CH$_2$=CH)(CH$_3$)SiO]$_2$[(CH$_3$)$_2$SiO]$_{10}$}Si(OCH$_3$)$_3$

{(CH$_2$=CHCH$_2$)(CH$_3$)$_2$SiO[(CH$_2$=CHCH$_2$)(CH$_3$)SiO]$_2$[(CH$_3$)$_2$SiO]$_{10}$}Si(OCH$_3$)$_3$

{(CH$_3$)$_3$SiO[(CH$_2$=CHCH$_2$CH$_2$CH$_2$)(CH$_3$)SiO]$_2$[(CH$_3$)$_2$SiO]$_{10}$}Si(OCH$_3$)$_3$

{(CH$_2$=CHCH$_2$CH$_2$CH$_2$)(CH$_3$)$_2$SiO[(CH$_2$=CH)(CH$_3$)SiO]$_2$[(CH$_3$)$_2$SiO]$_{10}$}Si(OCH$_3$)$_3$

{(CH$_2$=CHCH$_2$CH$_2$CH$_2$)(CH$_3$)$_2$SiO[(CH$_2$=CHCH$_2$CH$_2$CH$_2$)(CH$_3$)SiO]$_2$[(CH$_3$)$_2$SiO]$_{10}$}Si(OCH$_3$)$_3$

{(CH$_3$)$_3$SiO[(CH$_2$=CH)(CH$_3$)SiO]$_3$[(CH$_3$)$_2$SiO]$_{22}$}Si(OCH$_3$)$_3$

{(CH$_3$)$_3$SiO[(CH$_2$=CH)$_2$SiO]$_3$[(CH$_3$)$_2$SiO]$_{22}$}Si(OCH$_3$)$_3$

{(CH$_3$)$_3$SiO[(CH$_2$=CH)(CH$_3$)SiO]$_3$[(CH$_3$)$_2$SiO]$_{22}$}Si(OC$_2$H$_5$)$_3$

{(CH$_2$=CH)(CH$_3$)$_2$SiO[(CH$_2$=CH)(CH$_3$)SiO]$_3$[(CH$_3$)$_2$SiO]$_{22}$}Si(OCH$_3$)$_3$

{(CH$_2$=CH)(CH$_3$)$_2$SiO[(CH$_2$=CH)$_2$SiO]$_3$[(CH$_3$)$_2$SiO]$_{22}$}Si(OCH$_3$)$_3$

{(CH$_2$=CH)(CH$_3$)$_2$SiO[(CH$_2$=CH)(CH$_3$)SiO]$_3$[(CH$_3$)$_2$SiO]$_{22}$}Si(OC$_2$H$_5$)$_3$

{(CH$_3$)$_3$SiO[(CH$_2$=CHCH$_2$)(CH$_3$)SiO]$_3$[(CH$_3$)$_2$SiO]$_{22}$}Si(OCH$_3$)$_3$

{(CH$_3$)$_3$SiO[(CH$_2$=CHCH$_2$)$_2$SiO]$_3$[(CH$_3$)$_2$SiO]$_{22}$}Si(OCH$_3$)$_3$

{(CH$_2$=CHCH$_2$)(CH$_3$)$_2$SiO[(CH$_2$=CH)(CH$_3$)SiO]$_3$[(CH$_3$)$_2$SiO]$_{22}$}Si(OCH$_3$)$_3$

{(CH$_2$=CHCH$_2$)(CH$_3$)$_2$SiO[(CH$_2$=CHCH$_2$)(CH$_3$)SiO]$_3$[(CH$_3$)$_2$SiO]$_{22}$}Si(OCH$_3$)$_3$

{(CH$_3$)$_3$SiO[(CH$_2$=CHCH$_2$CH$_2$CH$_2$)(CH$_3$)SiO]$_3$[(CH$_3$)$_2$SiO]$_{22}$}Si(OCH$_3$)$_3$

{(CH$_2$=CHCH$_2$CH$_2$CH$_2$)(CH$_3$)$_2$SiO[(CH$_2$=CH)(CH$_3$)SiO]$_3$[(CH$_3$)$_2$SiO]$_{22}$}Si(OCH$_3$)$_3$

{(CH$_2$=CHCH$_2$CH$_2$CH$_2$)(CH$_3$)$_2$SiO[(CH$_2$=CHCH$_2$CH$_2$CH$_2$)(CH$_3$)SiO]$_3$[(CH$_3$)$_2$SiO]$_{22}$}Si(OCH$_3$)$_3$

{(CH$_3$)$_3$SiO[(CH$_2$=CH)(CH$_3$)SiO]$_4$[(CH$_3$)$_2$SiO]$_{50}$}Si(OCH$_3$)$_3$

{(CH$_3$)$_3$SiO[(CH$_2$=CH)$_2$SiO]$_4$[(CH$_3$)$_2$SiO]$_{50}$}Si(OCH$_3$)$_3$

{(CH$_3$)$_3$SiO[(CH$_2$=CH)(CH$_3$)SiO]$_4$[(CH$_3$)$_2$SiO]$_{50}$}Si(OC$_2$H$_5$)$_3$

{(CH$_2$=CH)(CH$_3$)$_2$SiO[(CH$_2$=CH)(CH$_3$)SiO]$_4$[(CH$_3$)$_2$SiO]$_{50}$}Si(OCH$_3$)$_3$

{(CH$_2$=CH)(CH$_3$)$_2$SiO[(CH$_2$=CH)$_2$SiO]$_4$[(CH$_3$)$_2$SiO]$_{50}$}Si(OCH$_3$)$_3$

{(CH$_2$=CH)(CH$_3$)$_2$SiO[(CH$_2$=CH)(CH$_3$)SiO]$_4$[(CH$_3$)$_2$SiO]$_{50}$}Si(OC$_2$H$_5$)$_3$

{(CH$_3$)$_3$SiO[(CH$_2$=CHCH$_2$)(CH$_3$)SiO]$_4$[(CH$_3$)$_2$SiO]$_{50}$}Si(OCH$_3$)$_3$

{(CH$_3$)$_3$SiO[(CH$_2$=CHCH$_2$)$_2$SiO]$_4$[(CH$_3$)$_2$SiO]$_{50}$}Si(OCH$_3$)$_3$

{(CH$_2$=CHCH$_2$)(CH$_3$)$_2$SiO[(CH$_2$=CH)(CH$_3$)SiO]$_4$[(CH$_3$)$_2$SiO]$_{50}$}Si(OCH$_3$)$_3$

{(CH$_2$=CHCH$_2$)(CH$_3$)$_2$SiO[(CH$_2$=CHCH$_2$)(CH$_3$)SiO]$_4$[(CH$_3$)$_2$SiO]$_{50}$}Si(OCH$_3$)$_3$

{(CH$_3$)$_3$SiO[(CH$_2$=CHCH$_2$CH$_2$CH$_2$)(CH$_3$)SiO]$_4$[(CH$_3$)$_2$SiO]$_{50}$}Si(OCH$_3$)$_3$

{(CH$_2$=CHCH$_2$CH$_2$CH$_2$)(CH$_3$)$_2$SiO[(CH$_2$=CH)(CH$_3$)SiO]$_4$[(CH$_3$)$_2$SiO]$_{50}$}Si(OCH$_3$)$_3$

{(CH$_2$=CHCH$_2$CH$_2$CH$_2$)(CH$_3$)$_2$SiO[(CH$_2$=CHCH$_2$CH$_2$CH$_2$)(CH$_3$)SiO]$_4$[(CH$_3$)$_2$SiO]$_{50}$}Si(OCH$_3$)$_3$

The organosiloxane of constituent (ii) is a constituent that allows the obtaining of a thermally conductive silicone rubber composition that has good handleability even when a thermally conductive filler of Component (B) is used in a large amount for producing thermally conductive silicone rubber. This constituent is expressed by the following general formula:

$$R^4{}_3SiO(R^4{}_2SiO)_pR^4{}_2Si-R^5-SiR^4{}_{(3-d)}(OR^3)_d.$$

In this formula, $R^4$ may represent the same or different univalent hydrocarbon groups, which may be represented by the same linear-chain alkyl groups, branched-chain alkyl groups, cyclic alkyl groups, aryl groups, aralkyl groups, alkenyl groups, or halogenated alkyl groups, as mentioned above. The most preferable of these are linear-chain alkyl groups, especially methyl groups. Furthermore, in the above formula, $R^5$ represents an oxygen atom or a bivalent hydrocarbon group. The bivalent hydrocarbon groups of $R^5$ may be exemplified by methylene, ethylene, propylene, isopropylene, butylene, or similar alkylene groups; ethyleneoxyethylene, ethyleneoxypropylene, or similar alkyleneoxyalkylene groups. The most preferable $R^5$ is an oxygen atom. In the above formula, $R^3$ is the same as defined above. "p" is an integer between 100 and 500, preferably between 105 and 500, more preferably between 110 and 500, and most preferably between 110 and 200. If the value of "p" is below the recommended lower limit, it may be impossible to use Component (B) in large quantities in the preparation of thermally conductive rubber. On the other hand, if the value of "p" exceeds the recommended upper limit, this will cause an excessive increase in the volume of molecules bound to the surface, and it will be an obstacle for using Component (B) in a large quantity. This tendency is revealed when the content of Component (B) in the composition of the invention is extremely high and exceeds 80 vol. % because this shortens the distances between particles in Component (B). In the above formula, "d" is an integer between 1 and 3, preferably 3.

The organosiloxane of constituent (ii) can be represented by compounds of the following formulas:

$(CH_3)_3SiO[(CH_3)_2SiO]_{118}(CH_3)_2Si-O-Si(OCH_3)_3$ $(CH_3)_3SiO[(CH_3)_2SiO]_{125}(CH_3)_2Si-O-Si(OCH_3)_3$ $(CH_3)_3SiO[(CH_3)_2SiO]_{140}(CH_3)_2Si-O-Si(OCH_3)_3$ $(CH_3)_3SiO[(CH_3)_2SiO]_{160}(CH_3)_2Si-O-Si(OCH_3)_3$ $(CH_3)_3SiO[(CH_3)_2SiO]_{200}(CH_3)_2Si-O-Si(OCH_3)_3$ $(CH_3)_3SiO[(CH_3)_2SiO]_{300}(CH_3)_2Si-C_2H_4-Si(OCH_3)_3$ $(CH_3)_3SiO[(CH_3)_2SiO]_{118}(CH_3)_2Si-O-SiCH_3(OCH_3)_2$ $(CH_3)_3SiO[(CH_3)_2SiO]_{79}[(CH_3)(C_6H_5)SiO]_{30}-Si(OCH_3)_3$ $(CH_3)_3SiO[(CH_3)_2SiO]_{79}[(C_6H_5)_2SiO]_{30}-Si(OCH_3)_3$

There are no special restrictions with regard to the amounts in which Component (C) can be used in the composition, and its dispersity in the prepared thermally conductive silicone rubber composition can be improved when it treats the surface of Composition (B). More specifically, Component (C) can be used in an amount within the range of 0.1 to 10 parts by mass, preferably 0.1 to 5 parts by mass per 100 parts by mass of Component (B). If Component (C) is used in an amount less than the recommended lower limit, then, in combination with a large quantity of Component (B), this will either impair the physical properties and moldability of the obtained silicone rubber composition or will cause precipitation and separation of Component (B) from the obtained silicone rubber composition during storage. If, on the other hand, the amount of Component (C) exceeds the recommended upper limit, it will adversely affect the physical characteristics of the obtained silicone rubber. Two or more types of Component (C) can be used simultaneously. Component (C) may also be used in combination with the alkoxysilane compound of the aforementioned formula:

$R^2_{(4-g)}Si(OR^3)_g$, wherein $R^2$ and $R^3$ are the same groups as defined above, and "g" is an integer between 1 and 4.

Component (C) can be added to the composition by using the following methods: (1) Component (C) is mixed with Component (B), and then Component (B) surface-treated with Component (C) is added; (2) Component (C) is added to a mixture of Components (A) and (B), and then Component (B) surface-treated with Component (C) in Component (A) is added; (3) all Components (A), (B), and (C) are mixed simultaneously, and then Component (B) surface-treated with Component (C) is added. Most preferable is method (3). Thus, Component (C) may be used in the form of coating on the surface of Component (B) or can be added independently. In order to accelerate surface treatment of Component (B) with Component (C), the process may be carried out with heating or by using an acidic substance, such as acetic acid, phosphoric acid, etc., in combination with a basic substance such as a trialkylamine, tertiary ammonium salts, gaseous ammonia, ammonium carbonate, etc.

When curing of the composition is carried out by means of a hydrosilylation reaction, curing agent (D) is composed of an organopolysiloxane having on average two or more silicon-bonded hydrogen atoms in one molecule and a platinum catalyst. The silicon-bonded groups of the aforementioned organopolysiloxane are the same linear-chain alkyl groups, branched-chain alkyl groups, cyclic alkyl groups, aryl groups, aralkyl groups, and halogenated alkyl groups that have been mentioned earlier, of which most preferable are alkyl and aryl groups, especially methyl and phenyl groups. There are no special restrictions with regard to the viscosity of this organopolysiloxane at 25° C., preferably the viscosity should be within the range of 1 to 100,000 mPa·s, and preferably in the range of 1 to 5,000 mPa·s. There are no restrictions to the molecular structure of the aforementioned organopolysiloxane that may have a linear-chain, branched-chain, partially branched linear-chain, cyclic, or dendritic (dendrimer) molecular structure. Such molecular structures may be contained in polymers, copolymers, and polymer mixtures of the aforementioned organopolysiloxane.

The organopolysiloxane mentioned above may be represented by the following compounds: dimethylpolysiloxane capped at both molecular terminals with dimethylhydrogensiloxy groups; a copolymer of methylhydrogensiloxane and dimethylsiloxane capped at both molecular terminals with trimethylsiloxy groups; a copolymer of methylhydrogensiloxane and dimethylsiloxane capped at both molecular terminals with dimethylhydrogensiloxy groups; an organosiloxane copolymer composed of siloxane units represented by the following formulas: $(CH_3)_3SiO_{1/2}$, $(CH_3)_2HSiO_{1/2}$, and $SiO_{4/2}$; or mixtures of two or more of the above.

The last-mentioned organopolysiloxane should be used in amount required for curing the composition. More specifically, it should be added in such an amount that the content of silicon-bonded hydrogen atoms in this component constitutes 0.1 to 10 moles, preferably 0.1 to 5 moles, and even more preferably 0.1 to 3.0 moles per 1 mole of silicon-bonded alkenyl groups in Component (A). If the content of this component is below the recommended lower limit, the obtained silicone composition will reveal a tendency toward incomplete curing; if, on the other hand, the content exceeds the recommended upper limit, the obtained silicone rubber will be too hard and will show a tendency toward an increase in surface cracking.

The platinum-type catalyst is used in the composition for accelerating the process of curing. Examples of such a catalyst are chloroplatinic acid, an alcohol solution of chloroplatinic acid, platinum-olefin complex, platinum-alkenylsiloxane complex, and platinum-carbonyl complex.

The platinum-type catalyst should be used in an amount required for curing the composition of the invention. In particular, in terms of mass units, it should be added in an amount of 0.01 to 1,000 ppm, preferably 0.1 to 500 ppm of metallic platinum per Component (A). If the added amount of the catalyst is below the recommended lower limit, there will be a tendency toward incomplete curing of the obtained silicone rubber composition, and if, on the other hand, it is added in an amount exceeding the recommended upper limit, this will not produce a noticeable effect.

When the composition is cured by a condensation reaction, Component (D) is comprised of a silane that contains in one molecule at least three silicon-bonded hydrolyzable groups, or its partially hydrolyzed product. If necessary, Component (D) may also be comprised of a condensation-reaction catalyst. The silicon-bonded hydrolyzable groups contained in the silane may be exemplified by the same alkoxy, alkoxyalkoxy, acyloxy, ketoxime, alkenoxy, amino, aminoxy, and amide groups as those mentioned above. Groups other than the aforementioned hydrolyzable groups on silicone atoms of the silane may be exemplified by the same linear-chain alkyl groups, branched-chain alkyl groups, cyclic alkyl groups, alkenyl groups, aryl groups, aralkyl groups, and halogenated alkyl groups as those mentioned above. Most preferable silanes or their hydrolyzed products can be exemplified by methyltriethoxysilane, vinyltriethoxysilane, vinyltriacetoxysilane, and ethylorthosilicate.

The aforementioned silane or hydrolyzed product thereof should be used in the composition in an amount required for curing of the composition, in particular, in an amount of 0.01 to 20 parts by mass, preferably 0.1 to 10 parts by mass per 100 parts by mass of Component (A). If the silane or the hydrolyzed product thereof is used in an amount below the recommended lower limit, this will impair the storage stability of the obtained composition and will lower the adhesive strength of the composition. If they are used in an amount exceeding the recommended upper limit, this will noticeably delay the curing process.

The condensation-reaction catalysts may also comprise arbitrary components which are not indispensable when a curing agent that contains a silane with aminoxy, amine, ketoxime, or similar hydrolyzable groups is used. Examples of such condensation-reaction catalysts are the following: tetrabutyl titanate, tetraisopropyl titanate, or similar organo titanic acid esters; diisopropoxy bis(acetylacetate) titanium, diisopropoxy bis(ethylacetoacetate) titanium, or similar organo titanium chelate compounds; aluminum tris(acetylacetonate), aluminum tris(ethylacetoacetate), or similar organo aluminum compounds; zirconium tetra(acetylacetonate), zirconium tetrabutylate, or similar organic zirconium compounds; dibutyl tin dioctoate, dibutyl tin dilaurate, butyl tin-2-ethylhexoate, or similar organic tin compounds; tin naphthenate, tin oleate, tin butylate, cobalt naphthenate, zinc stearate, or similar metal salts of organic carboxylic acids; hexylamine, dodecylamine phosphate, or similar amine compounds or their salts; benzyltriethyl ammonium acetate, or similar tertiary ammonium salts; potassium acetate, lithium nitrate, or similar lower fatty acid salts of alkali metals; dimethylhydroxylamine, diethylhydroxylamine, or similar dialkylhydroxylamines; and organic silicon compounds that contain guanidyl groups.

The aforementioned condensation-reaction catalyst can be used in the composition in arbitrary amounts, provided that these amounts ensure curing. In particular, this catalyst can be used in an amount of 0.01 to 20 parts by mass, preferably 0.1 to 10 parts by mass per 100 parts by mass of Component (A). When the aforementioned catalyst is an indispensable component and is used in an amount less than the lower limit recommended above, it would be difficult to provide complete curing of the composition. If, on the other hand, the amount of the catalyst exceeds the recommended upper limit, this will impair storage stability of the composition.

When curing is carried out by a free-radical reaction with the use of an organic peroxide compound, then Component (D) should be comprised of an organic peroxide compound such as benzoyl peroxide, dicumyl peroxide, 2,5-dimethyl bis(2,5-t-butylperoxy)hexane, di-t-butylperoxide, and t-butylperbenzoate. The organic peroxides should be used in amounts sufficient for curing, in particular, in an amount of 0.1 to 5 parts by mass per 100 parts by mass of the organopolysiloxane that constitutes Component (A).

Component (E) is an organopolysiloxane that significantly improves the physical characteristics of silicone rubber obtained by curing the present composition. This component consists of the following units: $SiO_{4/2}$, $R^1R^2{}_2SiO_{1/2}$, and $R^2{}_3SiO_{1/2}$. In the above formulas, $R^1$ is a univalent hydrocarbon group that contains unsaturated aliphatic bonds. The aforementioned univalent hydrocarbon group may be exemplified by the same groups as mentioned above, in particular, vinyl groups. In the above formula, $R^2$ designates a univalent hydrocarbon group that does not contain unsaturated aliphatic bonds. This group is the same as exemplified above for $R^2$, in particular, methyl and phenyl groups. The most preferable organopolysiloxane of Component (E) composed of the aforementioned units is the one represented by the following formula:

Wherein $R^1$ and $R^2$ are the same groups as defined above; "h", "i", and "j" are positive numbers; and "(i+j)/h" is within the range of 0.3 to 3.0, preferably within the range of 0.3 to 2.5, and most preferably within the range of 0.3 to 2.0. It is recommended that "j/h" be within the range of 0.01 to 2.0, preferably within the range of 0.02 to 2.0, and most preferably within the range of 0.03 to 2.0. There are no special restrictions with regard to the mass-average molecular weight of the aforementioned Component (E), but it may be recommended to provide a mass-average molecular weight in the range of 1,000 to 20,000, preferably 5,000 to 20,000, and most preferably 10,000 to 20,000.

The organopolysiloxane of Component (E) can be prepared by co-hydrolyzing the silanes of the formulas given below and by subjecting them to a condensation reaction: $SiX_4$, $R^1R^2{}_2SiX$, and $R^2{}_3SiX$, wherein $R^1$ and $R^2$ are the same groups as defined above, X designates a halogen atom such as chlorine, bromine, iodine, etc., or a methoxy group, ethoxy group, propoxy group, or a similar alkoxy group. When hydrolysis and a condensation reaction are carried out, it is recommended to conduct the reaction in the presence of a trifluoroacetic acid or a similar acid.

Component (E) can be used in the composition in an amount of 2 to 10 mass % per sum of Components (A) and (E). If it is used in an amount below the recommended lower limit, this will lower the physical characteristics of the obtained silicone rubber and will impair adhesive properties. On the other hand, if the added amount exceeds the recommended upper limit, the cured object will lose its rubber-like properties and will be too hard and brittle.

Component (F) is added to the composition for imparting to it thixotropic properties. This component is represented by the following general formula:

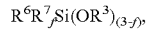

wherein $R^3$ is the same as defined above; $R^6$ is a substituent that shows non-affinity of the present component with respect to aforementioned component (A) and that can be represented by the following specific examples: 3-glicidoxypropyl, 4-glicidoxybutyl, or a similar glycidoxyalkyl group; 2-(3,4-epoxycyclohexyl)-ethyl, 3-(3,4-epoxycyclohexyl)-propyl, or a similar epoxycyclohexylalkyl group; 4-oxiranylbutyl, 8-oxiranyloctyl, or a similar oxiranylalkyl group; or 3-methacryloxypropyl, 3-acryloxypropyl, 4-methacryloxybutyl, or a similar organic group that contain acrylic or methacrylic groups. Of these, most preferable are glycidoxyalkyl groups, in particular, 3-glycidoxypropyl groups. $R^7$ is an alkyl group, such as methyl, ethyl, or propyl group. In the above formula, "f" is 0 or 1, and preferably 0. Aforementioned component (F) can be exemplified by 3-glycidoxypropyl trimethoxysilane, 3-glycidoxypropyl triethoxysilane, 3-glycidoxypropyl methyldimethoxysilane, 2-(3,4-epoxycyclohexyl)-ethyl trimethoxysilane, 3-methacryloxypropyl trimethoxysilane, and 3-methacryloxypropyl methyldimethoxysilane.

In the composition of the invention, component (F) should be used in an amount suitable for coating the surface of component (B) and for improving to an appropriate degree the thixotropic properties of the obtained thermally conductive silicone rubber composition. More specifically, component (F) can be used in an amount sufficient for coating 1 to 70%, preferably 4 to 60% of the entire surface of component (B) as determined on the basis of the BET specific surface area and amount of component (B) used in the composition. If component (F) is used in an amount below the recommended lower limit, the obtained silicone rubber composition will not possess sufficient thixotropy, and if, on the other hand, component (F) is added in an amount exceeding the recommended upper limit, thixotropy of the obtained composition will be too high, and the composition will be difficult to handle. The required amount of component (F) may be determined by means of the formula given below. The minimal surface area of the component (B) that can be coated with component (F) is calculated from the Stuardt-Briegleb model as 78.3×1000/[molecular weight of Component (F)].

$$M = \frac{\left[\begin{array}{c}\text{amount of Component (B)(g)} \times \\ \text{BET-specific surface area of Component (B)(m}^2\text{/g)}\end{array}\right]}{\left[\begin{array}{c}\text{minimal surface area coated} \\ \text{with the Component (F)(m}^2\text{/g)}\end{array}\right]},$$

wherein M is the amount of Component (F) (g) required to coat 100% of the entire surface of component (B).

Component (F) can be added to the composition by using the following methods: (1) Component (B) is mixed with Component (F), and then component (B) that was preliminarily surface-treated with component (F) is added; (2) Components (B), (C), and (F) are mixed, and then component (B) preliminarily surface-treated with components (C) and (F) is added; (3) Component (F) is added to a mixture of Components (A) and (B), and then Component (B) contained in Component (A) and surface-treated with Component (F) is added; (4) Components (C) and (F) are added to a mixture of Components (A) and (B) and then Component (B) contained in Component (A) and surface-treated with Components (C) and (F) is added. The method (4) is most preferable. Thus, component (F) can be contained in the composition independently or in the form of a coating on the surface of Component (B). Treatment of Component (B) with component (F) can be accelerated by heating, or with the use of an acetic acid, phosphoric acid, or a similar acidic substance in combination with a basic substance such as trialkylamine, tertiary ammonium salts, gaseous ammonia, ammonium carbonate, etc.

Other arbitrary components that can be added to the composition are exemplified by adhesion-imparting agents such as a siloxane compound that contains in one molecule at least one alkenyl group and silicon-bonded alkoxy group; a siloxane compound that contains in one molecule at least one silicon-bonded hydrogen atom and at least one silicon-bonded alkoxy group; a siloxane compound that contains in one molecule at least one alkenyl group, at least one silicon-bonded alkoxy group, and at least one epoxy-containing organic group; a siloxane compound that contains in one molecule at least one silicon-bonded hydrogen atom, at least one silicon-bonded alkoxy group, and at least one epoxy-containing organic group; a siloxane compound that contains in one molecule at least one alkenyl group, at least one silicon-bonded alkoxy group, and at least one organic group that contains a methacrylic group; a siloxane compound that contains in one molecule at least one silicon-bonded hydrogen atom, at least one silicon-bonded alkoxy group, and at least one organic group that contains an acrylic or methacrylic group; a mixture or a reaction mixture composed of a siloxane compound or an alkoxysilane compound that contains an epoxy-containing organic group and a siloxane compound that contains in one molecule at least one silicon-bonded hydroxy group and at least one silicon-bonded alkenyl group. The aforementioned epoxy-containing organic group may be exemplified by the same group as mentioned above for $R^5$. And the aforementioned organic group that contains an acrylic or methacrylic group may be exemplified by the same group as mentioned above for $R^6$. There are no special restrictions with regard to the amounts in which the aforementioned adhesion-imparting agents can be used, but it may be recommended to use them in an amount of 0.001 to 10 mass % of the composition, preferably in an amount of 0.01 to 10 mass %, and most preferably 0.1 to 10 mass %.

Examples of other arbitrary components that can be added to the composition are the following: methyltrimethoxysilane, methylethyldimethoxysilane, methyltriethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, octylmethyldimethoxysilane, decyltrimethoxysilane, decyltriethoxysilane, or similar alkyl-containing alkoxysilanes that can be contained in the composition as surface-treating agents of the aforementioned Component (B). There are no special restrictions with regard to the amounts in which the aforementioned alkyl-containing alkoxysilanes can be used, but it will be sufficient if they cover at least 10% of the surface of Component (B) and preferably more than 50%. The amount of an alkyl-containing alkoxysilane that has to be used in the composition can be determined by the formula given below. Since the minimal surface area coated with an alkyl-containing alkoxysilane can be calculated by the molecular model of Stuart-Briegleb, such a surface can be determined as 78.3×1000/(molecular weight of alkyl-containing alkoxysilane).

Therefore, the following expression can be written:

$$M' = \frac{\left[\begin{array}{c}\text{(amount of Component (B)(g)} \times \\ \text{BET-specific surface area of Component (B)(m}^2\text{/g)}\end{array}\right]}{\left[\begin{array}{c}\text{minimal surface area coated} \\ \text{with the alkyl-containing alkoxysilane (m}^2\text{/g)}\end{array}\right]},$$

wherein M' is the amount of alkyl-containing alkoxysilane (g) required to coat 100% of the entire surface of component (B).

Within the limits that do not interfere with the objects of the present invention, the composition may also be combined with additives such as pigments, dyes, fluorescent dyes, heat-resistant additives, triazole-type compounds, or other flame-retarding agents, plasticizers, and adhesion-imparting agents. In particular, when curing is carried out by means of a hydrosilylation reaction, the speed of curing of the composition can be adjusted and handleability can be improved when the composition is combined with 2-methyl-3-butyn-2-ol, 2-phenyl-3-butyn-2-ol, 1-ethynyl-1-cyclohexanol, or similar acetylene-type compounds; 3-methyl-3-penten-1-yne, 3,5-dimethyl-3-hexen-1-yne, or similar enyne compounds; as well as hydrazine-type compounds, phosphine-type compounds, mercaptane-type compounds, or similar curing inhibitors. There are no special restrictions with regard to the amounts in which the aforementioned curing inhibitors can be used, but it may be recommended to use them in an amount of 0.0001 to 1.0 mass %.

EXAMPLES

The thermally conductive silicone rubber composition of the invention will be further described in more detail by means of Practical and Comparative examples. The coefficients of thermal conductivity given in the examples were measured at 50° C. and all other characteristics were measured at 25° C.

Furthermore, the following starting materials were used in the Practical and Comparative examples.

Constituent (A1): dimethylpolysiloxane capped at both molecular terminals with dimethylvinylsiloxy groups (viscosity=400 mPa·s; content of vinyl groups=0.44 mass %);
Constituent (A2): dimethylpolysiloxane capped at both molecular terminals with dimethylvinylsiloxy groups (viscosity=2,100 mPa·s; content of vinyl groups=0.22 mass %);
Constituent (A3): dimethylpolysiloxane capped at both molecular terminals with dimethylvinylsiloxy groups (viscosity=2,000 mPa·s; content of vinyl groups=0.22 mass %);
Constituent (A4): dimethylpolysiloxane capped at both molecular terminals with dimethylvinylsiloxy groups (viscosity=10,700 mPa·s; content of vinyl groups=0.137 mass %);
Constituent (B1): spherical alumina powder with BET-specific surface area of 0.34 m²/g and with an average particle size of 8.2 μm;
Constituent (B2): irregular-shaped alumina powder with BET-specific surface area of 2.37 m²/g and with an average particle size of 1.1 μm;
Constituent (B3): round-shaped alumina powder with an average particle size of 10 μm;
Constituent (C1): organopolysiloxane represented by the following formula:

(CH$_2$=CH)(CH$_3$)$_2$SiO[(CH$_3$)$_2$SiO]$_{27}$Si(OCH$_3$)$_3$;

Constituent (C2): organopolysiloxane represented by the following formula:

(CH$_3$)$_3$SiO[(CH$_3$)$_2$SiO]$_{110}$Si(OCH$_3$)$_3$;

Constituent (D1): complex of platinum and 1,3-divinyl-1,1,3,3-tetramethyldisiloxane with 0.5 mass % of metallic platinum;
Constituent (D2): a copolymer of methylhydrogensiloxane and dimethylsiloxane capped at both molecular terminals with trimethylsiloxy groups that contain in one molecule on average 5 silicon-bonded hydrogen atoms (viscosity=5 mPa·s; content of silicon-bonded hydrogen atoms=0.74 mass %);
Constituent (D3): a copolymer of methylhydrogensiloxane and dimethylsiloxane capped at both molecular terminals with trimethylsiloxy groups that contains in one molecule on average 3 silicon-bonded hydrogen atoms (viscosity=6 mPa·s; content of silicon-bonded hydrogen atoms=0.33 mass %);
Constituent (D4): a dimethylsiloxane polymer capped at both molecular terminals with dimethylhydrogensiloxy groups that contains in one molecule 2 silicon-bonded hydrogen atoms (viscosity=15 mPa·s; content of silicon-bonded hydrogen atoms=0.125 mass %);
Constituent (E1): organopolysiloxane represented by the following average unit formula:

[(CH$_2$=CH)(CH$_3$)$_2$SiO$_{1/2}$]$_{0.02}$[(CH$_3$)$_3$SiO$_{1/2}$]$_{0.43}$(SiO$_{4/2}$)$_{0.55}$;

Constituent (E2): a mixture of dimethylpolysiloxane capped at both molecular terminals with dimethylvinylsiloxy groups (viscosity=400 mPa·s; content of vinyl groups=0.44 mass %) and constituent (E1), with the content of said constituent (E1) is 28 mass % per the mixture;
Constituent (F1): 3-glycidoxypropyl trimethoxysilane (the minimal coated surface=330 m²/g);
Constituent (G1): a copolymer of dimethylsiloxane and methylvinylsiloxane capped at both terminals with 3-glicidoxypropyl dimethoxysiloxy groups (viscosity=20 mPa·s; content of vinyl groups=9.6 mass %);
Constituent (H1): a mixture of dimethylpolysiloxane capped at both molecular terminals with dimethylvinylsiloxy groups (viscosity=2,100 mPa·s; content of vinyl groups=0.22 mass %) and carbon black (Thermax Floform N-990, the product of Cancarb Co.), with the content of said carbon black is 50 mass % per the mixture;
Constituent (H2): a mixture of dimethylpolysiloxane capped at both molecular terminals with dimethylvinylsiloxy groups (viscosity=2,100 mPa·s; content of vinyl groups=0.22 mass %) and carbon black (Thermax Floform N-990, the product of Cancarb Co.), with the content of said carbon black is 50 mass % per the mixture.

Practical Example 1

Liquid Component (A) was prepared by mixing the following constituents for 15 min. at room temperature: 42.60 parts by mass of Constituent (A1); 168.70 parts by mass of Constituent (A2); 741.00 parts by mass of Constituent (B1); 504.00 parts by mass of Constituent (B2); 3.80 parts by mass of Constituent (C1); 3.82 parts by mass of Constituent (C2); 34.80 parts by mass of Constituent (E2); 2.79 parts by mass of methyltrimethoxysilane (the minimal coating surface=575 m²/g); and 0.3 parts by mass of constituent (F1). The constituents were further mixed for 1 hour at 180° C. and under a reduced pressure of 10 mmHg and cooled to room temperature for 1 hour under stirring conditions. The obtained mixture was mixed for 15 min. at room temperature with 1.80 parts by mass of constituent (D1) and then mixed at room temperature for 30 min. under a reduced pressure of 10 mmHg. As a result, a liquid component (A) was produced.

Independently, liquid Component (B) was prepared by mixing the following constituents for 15 min. at room temperature: 33.80 parts by mass of Constituent (A1); 128.90 parts by mass of Constituent (A2); 741.00 parts by mass of Constituent (B1); 504.00 parts by mass of Constituent (B2); 3.85 parts by mass of Constituent (C1); 3.81 parts by mass of Constituent (C2); 33.80 parts by mass of Constituent (E2); 2.74 parts by mass of methyltrimethoxysilane; 0.30 parts by mass of constituent (F1), and 1.20 parts by mass of constituent (H1). The constituents were further mixed for 1 hour at 180° C. and under a reduced pressure of 10 mmHg and cooled to room temperature for 1 hour under stirring conditions. The obtained mixture was mixed for 15 min. at room temperature with 17.92 parts by mass of constituent (D2), 8.64 g of constituent (D3), 8.85 parts by mass of constituent (D4), and 15.18 parts by mass of constituent (G1). The mixture was then stirred at room temperature for 30 min. under a reduced pressure of 10 mmHg. As a result, a liquid component (B) was produced.

A thermally conductive silicone rubber composition was prepared by mixing the aforementioned liquid Components (A) and (B) in a 1:1 ratio. In the prepared thermally conductive rubber composition, the mole ratio of the total number of silicon-bonded hydrogen atoms contained in Constituents (D2), (D3), and (D4) to the total number of vinyl groups contained in Constituents (A1) and (A2) was 1.51; the content of Constituent (B1) and Constituent (B2) was 55 vol. %, and the content of Constituent (E1) was 4.3 mass % per the sum of Constituents (A1), (A2), and (E1). The content of Constituent (F1) was sufficient to coat 6.87% of the entire surface of Constituents (B1) and (B2). The content of methyltrimethoxysilane was sufficient to coat 110% of the entire surface of Constituents (B1) and (B2). Characteristics of the obtained thermally conductive silicone rubber composition and thermally conductive silicone rubber were measured by the methods described below, and the results of the measurements are shown in Table 1.

[Viscosity of Thermally Conductive Silicone Rubber Composition]

This characteristic was measured by means of the rheometer (AR 550; the product of TA Instruments Co., Ltd.). The geometry was a 20 mm diameter. And a 2°-cone/plate was used. The viscosity was measured at different speeds of rotation, such as 0.3 rpm and 3.4 rpm. Upon completion of measurements at 0.3 rpm, the sample was left intact for 5 min., and then the measurement was continued at 3.4 rpm. The viscosity was the value obtained in each measurement after 10 min.

[Coefficient of Thermal Conductivity of Silicone Rubber]

In accordance with the conventional method for measuring coefficients of thermal conductivity in thermally conductive silicone rubber compositions, the respective coefficient of silicone rubber was measured by a tester for measuring thermal resistance of resins (the product of Hitachi Seisakusho Co., Ltd.). In the measurement specimens, the thermally conductive silicone rubber composition was sandwiched between two silicon chips of Hitachi Seisakusho Co., Ltd., having areas of 1 cm×1 cm and thicknesses of 0.0725 cm, and was squeezed to thicknesses of 50 µm, 100 µm, and 150 µm, and then cured by heating for 30 min. at 150° C. Thermal resistance in specimens of different thicknesses was measured at a load of 50 N and at 50° C. The values of thermal resistance were used for calculating respective coefficients of thermal conductivity.

[Adhesive Strength of Thermally Conductive Silicone Rubber]

A thermally conductive silicone rubber composition was sandwiched between adherends and cured for 30 min. at 150° C. The adherends were comprised of aluminum plates from Paltec Co. Ltd. (JIS H 4000 A1050P). The area of adhesion was 25 mm×10 mm, and the thickness of the adhesive layer was equal to 1 mm. Tensile shear adhesive strength of the obtained thermally conductive rubber was measured according to JIS K 6249.

[Elongation of Thermally Conductive Silicone Rubber]

The obtained thermally conductive silicone rubber composition was poured into a mold having an area of 120 mm×120 mm and a depth of 2 mm, and a thermally conductive silicone rubber sheet was produced by heating the composition for 15 min. at 150° C. The sheet was again heated for 60 min. at 150° C., whereby a specimen was produced. The specimen was tested with regard to elongation of the obtained thermally conductive silicone rubber according to JIS K 6251.

[Tensile Strength of Thermally Conductive Silicone Rubber]

A thermally conductive silicone rubber sheet was produced by the same method as described above and turned into a specimen. Tensile strength of the obtained thermally conductive silicone rubber was measure according to JIS K 6251.

[Hardness of Thermally Conductive Silicone Rubber]

A thermally conductive silicone rubber sheet was produced by the same method as described above and turned into a specimen. Hardness of the obtained thermally conductive silicone rubber was measured by a type-A durometer according to JIS K 6253.

[Stencil Printing Test of Thermally Conductive Silicone Rubber]

A squeegee test stage having the area of 7 cm×7 cm and the depth of 1 mm was filled with the thermally conductive silicone rubber composition. A printing form with 400 pins on an area of 5 cm×5 cm was immersed into the squeegee stage for 1 sec., and then the thermally conductive silicone rubber composition contained on the pins was applied for 1 sec. onto an aluminum substrate having a surface area of 7 cm×7 cm and the thickness of 4 mm. The test was conducted four times for each specimen in order to determine the average amount of the composition transferred after two or more transfer steps. The obtained amount was divided by 400 for determining the amount transferred by one pin. Deposition properties were evaluated by checking whether or not the thermally conductive composition was transferred with the third specimen.

Practical Example 2

Liquid Component (A) was prepared by mixing the following constituents for 15 min. at room temperature: 42.60 parts by mass of Constituent (A1); 168.70 parts by mass of Constituent (A2); 741.00 parts by mass of Constituent (B1); 504.00 parts by mass of Constituent (B2); 3.80 parts by mass of Constituent (C1); 3.82 parts by mass of Constituent (C2); 34.80 parts by mass of Constituent (E2); 2.79 parts by mass of methyltrimethoxysilane (the minimal coated surface=575 $m^2/g$); and 0.30 parts by mass of Constituent (F1). The constituents were further mixed for 1 hour at 180° C. and under a reduced pressure of 10 mmHg and cooled to room temperature for 1 hour under stirring conditions. The obtained mixture was mixed for 15 min. at room temperature with 1.80 parts by mass of constituent (D1) and then mixed at room temperature for 30 min. under a reduced pressure of 10 mmHg. As a result, a liquid component (A) was produced.

Independently, liquid Component (B) was prepared by mixing the following constituents for 15 min. at room temperature: 31.57 parts by mass of Constituent (A1); 126.26 parts by mass of Constituent (A2); 741.00 parts by mass of Constituent (B1); 504.00 parts by mass of Constituent (B2); 3.82 parts by mass of Constituent (C1); 3.82 parts by mass of Constituent (C2); 34.30 parts by mass of Constituent (E2); 1.0 part by mass of methyltrimethoxysilane; 2.60 parts by mass of constituent (F1), and 1.20 parts by mass of constituent (H1). The constituents were further mixed for 1 hour at 180° C. and under a reduced pressure of 10 mmHg and cooled to room temperature for 1 hour under stirring conditions. The obtained mixture was mixed for 15 min. at room temperature with 17.95 parts by mass of constituent (D2), 8.65 parts by mass of constituent (D3), 8.88 parts by mass of constituent (D4), and 15.19 parts by mass of constituent (G1). The mixture was then stirred at room temperature for 30 min. under a reduced pressure of 10 mmHg. As a result, a liquid component (B) was produced.

A thermally conductive silicone rubber composition was prepared by mixing the aforementioned liquid Components (A) and (B) in a 1:1 ratio. In the prepared thermally conductive rubber composition, the mole ratio of the total amount of silicon-bonded hydrogen atoms contained in Constituents (D2), (D3), and (D4) to the total amount of vinyl groups contained in Constituents (A1) and (A2) was 1.52; the content of Constituent (B1) and Constituent (B2) was 55 vol. %, and the content of Constituent (E1) was 4.4 mass % per the sum of Constituents (A1), (A2), and (E1). The content of Constituent (F1) was sufficient for coating 33.6% of the entire surface of both Constituents (B1) and (B2). The content of the methyltrimethoxysilane was sufficient to for coating 75.3% of the entire surface of both Constituents (B1) and (B2). Characteristics of the obtained thermally conductive silicone rubber composition and thermally conductive silicone rubber were measured by the same methods as in Practical Example 1, and the results of the measurements are shown in Table 1.

Practical Example 3

A mixture was prepared by mixing for 15 min. at room temperature the following components: 41.48 parts by mass of Constituent (A1); 165.92 parts by mass of Constituent (A2); 741.00 parts by mass of Constituent (B1); 504.00 parts by mass of Constituent (B2); 3.82 parts by mass of Constituent (C1); 3.81 parts by mass of Constituent (C2); 34.80 parts by mass of Constituent (E2), 1.00 part by mass of methyltrimethoxysilane (the minimal coated surface=575 m$^2$/g); and 2.63 parts by mass of Constituent (F1). The constituents were further mixed for 1 hour at 180° C. and under a reduced pressure of 10 mmHg and cooled to room temperature for 1 hour under stirring conditions. The obtained mixture was mixed for 15 min. at room temperature with 1.80 parts by mass of constituent (D1) and then mixed at room temperature for 30 min. under a reduced pressure of 10 mmHg. As a result, a liquid component (A) was produced.

Independently, liquid Component (B) was prepared by mixing the following constituents for 15 min. at room temperature: 31.57 parts by mass of Constituent (A1); 126.26 parts by mass of Constituent (A2); 741.00 parts by mass of Constituent (B1); 504.00 parts by mass of Constituent (B2); 3.82 parts by mass of Constituent (C1); 3.82 parts by mass of Constituent (C2); 34.30 parts by mass of Constituent (E2); 1.00 part by mass of methyltrimethoxysilane; 2.60 parts by mass of constituent (F1), and 1.20 parts by mass of constituent (H1). The constituents were further mixed for 1 hour at 180° C. and under a reduced pressure of 10 mmHg and cooled to room temperature for 1 hour under stirring conditions. The obtained mixture was mixed for 15 min. at room temperature with 17.95 parts by mass of constituent (D2), 8.65 parts by mass of constituent (D3), 8.88 parts by mass of constituent (D4), and 15.19 parts by mass of constituent (G1). The mixture was then stirred at room temperature for 30 min. under a reduced pressure of 10 mmHg. As a result, a liquid component (B) was produced.

A thermally conductive silicone rubber composition was prepared by mixing the aforementioned liquid Components (A) and (B) in a 1:1 ratio. In the prepared thermally conductive rubber composition, the mole ratio of the total amount of silicon-bonded hydrogen atoms contained in Constituents (D2), (D3), and (D4) to the total amount of vinyl groups contained in Constituents (A1) and (A2) was 1.52; the content of Constituent (B1) and Constituent (B2) was 55 vol. %, and the content of Constituent (E1) was 4.4 mass % per the sum of Constituents (A1), (A2), and (E1). The content of Constituent (F1) was sufficient for coating 60.3% of the entire surface of both Constituents (B1) and (B2). The content of the methyltrimethoxysilane was sufficient to for coating 39.7% of the entire surface of both Constituents (B1) and (B2). Characteristics of the obtained thermally conductive silicone rubber composition and thermally conductive silicone rubber were measured by the same methods as in Practical Example 1, and the results of the measurements are shown in Table 1.

Comparative Example 1

Liquid Component (A) was prepared by mixing for 15 min. at room temperature the following components: 120.00 parts by mass of Constituent (A3); 24.00 parts by mass of Constituent (A4); 850.00 parts by mass of Constituent (B3); 2.53 parts by mass of Constituent (C1); 2.65 parts by mass of Constituent (C2). The components were then stirred for 1 hour at room temperature under a reduced pressure below 10 mmHg. Following this, the mixture was further mixed for 15 min. with 1.00 part by mass of Constituent (D1) and then stirred for 30 min. at room temperature under a reduced pressure below 10 mmHg.

Independently, liquid Component (B) was prepared by mixing for 15 min. at room temperature the following constituents: 90.00 parts by mass of Constituent (A3); 20.00 parts by mass of Constituent (A4); 850.00 parts by mass of Constituent (B3); 2.64 parts by mass of Constituent (C1); 2.55 parts by mass of Constituent (C2); and 0.80 parts by mass of Constituent (H2). The components were then stirred for 1 hour at room temperature under a reduced pressure below 10 mmHg. Following this, the mixture was further mixed for 15 min. with 4.12 parts by mass of fumed silica having BET specific surface area of 200 m$^2$/g, 12.30 parts by mass of Constituent (D2), and 10.00 parts by mass of Constituent (G1). The mixture was then further mixed for 30 min. under a reduced pressure below 10 mmHg.

A thermally conductive silicone rubber composition was prepared by mixing the aforementioned liquid Components (A) and (B) in a 1:1 ratio. In the prepared thermally conductive rubber composition, the mole ratio of silicon-bonded hydrogen atoms contained in Constituent (D2) to the total amount of vinyl groups contained in Constituents (A3) and (A4) was 1.60; the total content of Constituents (B1), (B2), and (B3) was 59 vol. %. Characteristics of the obtained thermally conductive silicone rubber composition and thermally conductive silicone rubber were measured by the same methods as in Practical Example 1, and the results of the measurements are shown in Table 1.

TABLE 1

| | Example No. | | | |
|---|---|---|---|---|
| | Practical Examples | | | Comp. Ex. |
| Characteristics | 1 | 2 | 3 | 1 |
| Viscosity (Pa · s) | | | | |
| 0.3 rpm | 46.75 | 84.84 | 143.2 | 89.01 |
| 3.4 rpm | 31.38 | 38.68 | 57.53 | 62.01 |
| Coefficient of Thermal Conductivity (W/m · K) | 1.30 | 1.28 | 1.35 | 1.36 |
| Adhesive Strength (N/cm$^2$) | 329.6 | 330.5 | 336.6 | 237 |
| Elongation (%) | 79 | 76.3 | 82.5 | 75 |
| Tensile Strength (MPa) | 6.10 | 5.55 | 6.08 | 4.80 |
| Hardness | 84 | 83 | 85 | 80 |
| Stencil Deposited Amount (mg/pin) | 1.03 | 1.04 | 0.96 | 0.42 |
| Stencil Coating Properties | Good | Good | Good | Unsatisfactory |

INDUSTRIAL APPLICABILITY

Since the thermally conductive silicone rubber composition of the invention provides good handleability and proper thixotropic properties even when it is used with an increased amount of a thermally conductive filler, and since after curing it forms a thermoplastic conductive rubber with excellent adhesive properties, elongation characteristics, and high tensile strength even when it is used without reinforcement filler, it is suitable for use as a thermoconductive adhesive and heat-removing sealing material in the manufacture of electrical and electronic devices. Furthermore, the composition of the invention can be used in stencil printing for deposit in a rapid manner and in appropriate amounts onto the surfaces of electrical and electronic parts and devices.

The invention claimed is:

1. A thermally conductive silicone rubber composition comprising:
(A) an organopolysiloxane with the exception of below-given components (C) and (E);
(B) a thermally conductive filler;
(C) a composition selected from
(i) an organopolysiloxane represented by the following general formula:

$$[R^1_aR^2_{(3-a)}SiO(R^1_bR^2_{(2-b)}SiO)_m(R^2_2SiO)_n]_c$$
$$SiR^2_{[4-(c+d)]}(OR^3)_d$$

(wherein $R^1$ is a univalent hydrocarbon group with an aliphatic, unsaturated bonds, $R^2$ may designate the same or different univalent hydrocarbon groups that do not have aliphatic, unsaturated bonds, $R^3$ designates an alkyl group, alkoxyalkyl group, alkenyl group, or an acyl group; "a" is an integer between 0 and 3, "b" is 1 or 2, "c" is an integer between 1 and 3, "d" is an integer between 1 and 3; "(c+d)" is an integer between 2 and 4, "m" is an integer that is equal to or greater than 0, and "n" is an integer that is equal to or greater than 0; when "a" is 0, then "m" is an integer that is equal to or greater than 1);
(ii) an organopolysiloxane represented by the following general formula:

$$R^4_3SiO(R^4_2SiO)_pR^4_2Si\text{---}R^5\text{---}SiR^4_{(3-d)}(OR^3)_d$$

(wherein $R^3$ is the same defined above, $R^4$ represents the same or different univalent hydrocarbon groups, $R^5$ represents an oxygen atom or a bivalent hydrocarbon group, "p" is an integer between 100 and 500, and "d" is the same defined above); or
(iii) a mixture of two or more of the above constituents (i) and (ii);
(D) a curing agent;
(E) an organopolysiloxane composed of the following units: $SiO_{4/2}$, $R^1R^2_2SiO_{1/2}$, and $R^2_3SiO_{1/2}$ (wherein $R^1$ and $R^2$ are the same as defined above); and
(F) a silane compound represented by the following general formula:

$$R^6R^7_fSi(OR^3)_{(3-f)}$$

{wherein $R^3$ is the same as defined above; $R^6$ is a substituent showing no affinity with respect to aforementioned component (A); $R^7$ is an alkyl group; "f" is 0 or 1},
wherein component (E) is contained in an amount of 2 to 10 mass % per sum of components (A) and (E), and wherein said component (F) is contained in an amount of from 0.01×M to 0.70×M, wherein M is a value according to the following formula:

$$M = \frac{[\text{amount of Component (B) (g)} \times \text{BET-specific surface area of Component (B) (m}^2\text{/g)]}}{[\text{minimal surface area coated with the Component (F) (m}^2\text{/g)]}}$$

and M represents a required amount of component (F) to coat 100% of the entire surface of component (B).

2. The thermally conductive silicone rubber composition of claim 1, wherein said Component (B) has an average particle size within the range of 0.1 to 100 μm.

3. The thermally conductive silicone rubber composition of claim 1, wherein said Component (B) is an alumina powder.

4. The thermally conductive silicone rubber composition of claim 3, wherein the BET specific surface area of said Component (B) is equal to or below 5.0 m²/g.

5. The thermally conductive silicone rubber composition of claim 3, wherein said Component (B) comprises a mixture of spherical alumina powder ($B_1$) with an average particle size in the range of 1 to 30 μm (excluding 1 μm particles) and a spherical or irregular-shaped alumina powder ($B_2$) with an average particle size in the range of 0.1 to 5 μm.

6. The thermally conductive silicone rubber composition of claim 5, wherein said Component (B) comprises 30 to 90 mass % of said constituent ($B_1$) and 10 to 70 mass % of said constituent ($B_2$).

7. The thermally conductive silicone rubber composition of claim 1, wherein said Component (B) is used in an amount of 300 to 2,500 parts by mass per 100 parts by mass of said Component (A).

8. The thermally conductive silicone rubber composition of claim 1, wherein said Component (C) is used in an amount of 0.1 to 10 parts by mass per 100 parts by mass of said Component (B).

9. The thermally conductive silicone rubber composition of claim 1, wherein said Component (B) is surface-treated with said Component (C) in said Component (A).

10. The thermally conductive silicone rubber composition of claim 1, wherein $R^6$ in the formula of said Component (F) is an epoxy-containing organic group.

11. The thermally conductive silicone rubber composition of claim 1, wherein said thermally conductive silicone rubber composition is cured in a hydrosilylation reaction, condensation reaction, or by a free-radical reaction with the use of an organic peroxide.

12. A thermally conductive silicone rubber composition comprising:
(A) an organopolysiloxane with the exception of below-given components (C) and (E);
(B) an alumina powder as a thermally conductive filler having an average particle size within the range of 0.1 to 100 μm;
(C) a composition selected from
(i) an organopolysiloxane represented by the following general formula:

$$[R^1_aR^2_{(3-a)}SiO(R^1_bR^2_{(2-b)}SiO)_m(R^2_2SiO)_n]_c$$
$$SiR^2_{[4-(c+d)]}(OR^3)_d$$

(wherein $R^1$ is a univalent hydrocarbon group with an aliphatic, unsaturated bonds, $R^2$ may designate the same or different univalent hydrocarbon groups that do not have aliphatic, unsaturated bonds, $R^3$ designates an alkyl group, alkoxyalkyl group, alkenyl group, or an acyl group; "a" is an integer between 0 and 3, "b" is 1 or 2, "c" is an integer between 1 and 3, "d" is an integer between 1 and 3; "(c+d)" is an integer between 2 and 4, "m" is an integer that is equal to or greater than 0, and "n" is an integer that is equal to or greater than 0; when "a" is 0, then "m" is an integer that is equal to or greater than 1);
(ii) an organopolysiloxane represented by the following general formula:

$$R^4_3SiO(R^4_2SiO)_pR^4_2Si\text{---}R^5\text{---}SiR^4_{(3-d)}(OR^3)_d$$

(wherein $R^3$ is the same defined above, $R^4$ represents the same or different univalent hydrocarbon groups, $R^5$ represents an oxygen atom or a bivalent hydrocarbon group, "p" is an integer between 100 and 500, and "d" is the same defined above); or (iii) a mixture of two or more of the above constituents (i) and (ii);
(D) a curing agent;
(E) an organopolysiloxane composed of the following units: $SiO_{4/2}$, $R^1R^2{}_2SiO_{1/2}$, and $R^2{}_3SiO_{1/2}$ (wherein $R^1$ and $R^2$ are the same as defined above); and
(F) a silane compound represented by the following general formula:

$$R^6R^7{}_f Si(OR^3)_{(3-f)}$$

{wherein $R^3$ is the same as defined above; $R^6$ is a substituent showing no affinity with respect to aforementioned component (A); $R^7$ is an alkyl group; "f" is 0 or 1}, wherein component (E) is contained in an amount of 2 to 10 mass % per sum of components (A) and (E), and wherein said component (F) is contained in an amount of from 0.01×M to 0.70×M, wherein M is a value according to the following formula:

$$M = \frac{[\text{amount of Component (B) (g)} \times \text{BET-specific surface area of Component (B) (m}^2\text{/g)}]}{[\text{minimal surface area coated with the Component (F) (m}^2\text{/g)}]}$$

and M represents a required amount of component (F) to coat 100% of the entire surface of component (B).

13. The thermally conductive silicone rubber composition of claim 12, wherein the BET specific surface area of said Component (B) is equal to or below 5.0 m²/g.

14. The thermally conductive silicone rubber composition of claim 12, wherein said Component (B) comprises a mixture of spherical alumina powder ($B_1$) with an average particle size in the range of 1 to 30 μm (excluding 1 μm particles) and a spherical or irregular-shaped alumina powder ($B_2$) with an average particle size in the range of 0.1 to 5 μm.

15. The thermally conductive silicone rubber composition of claim 12, wherein $R^6$ in the formula of said Component (F) is an epoxy-containing organic group.

16. A thermally conductive silicone rubber composition comprising:
(A) an organopolysiloxane with the exception of below-given components (C) and (E);
(B) a thermally conductive filler having an average particle size within the range of 0.1 to 100 μm;
(C) a composition selected from
(i) an organopolysiloxane represented by the following general formula:

$$[R^1{}_a R^2{}_{(3-a)}SiO(R^1{}_b R^2{}_{(2-b)}SiO)_m (R^2{}_2 SiO)_n]_c SiR^2{}_{[4-(c+d)]}(OR^3)_d$$

(wherein $R^1$ is a univalent hydrocarbon group with an aliphatic, unsaturated bonds, $R^2$ may designate the same or different univalent hydrocarbon groups that do not have aliphatic, unsaturated bonds, $R^3$ designates an alkyl group, alkoxyalkyl group, alkenyl group, or an acyl group; "a" is an integer between 0 and 3, "b" is 1 or 2, "c" is an integer between 1 and 3, "d" is an integer between 1 and 3; "(c+d)" is an integer between 2 and 4, "m" is an integer that is equal to or greater than 0, and "n" is an integer that is equal to or greater than 0; when "a" is 0, then "m" is an integer that is equal to or greater than 1);

(ii) an organopolysiloxane represented by the following general formula:

$$R^4{}_3 SiO(R^4{}_2 SiO)_p R^4{}_2 Si—R^5—SiR^4{}_{(3-d)}(OR^3)_d$$

(wherein $R^3$ is the same defined above, $R^4$ represents the same or different univalent hydrocarbon groups, $R^5$ represents an oxygen atom or a bivalent hydrocarbon group, "p" is an integer between 100 and 500, and "d" is the same defined above); or (iii) a mixture of two or more of the above constituents (i) and (ii);

(D) a curing agent;
(E) an organopolysiloxane composed of the following units: $SiO_{4/2}$, $R^1R^2{}_2SiO_{1/2}$, and $R^2{}_3SiO_{1/2}$ (wherein $R^1$ and $R^2$ are the same as defined above); and
(F) a silane compound represented by the following general formula:

$$R^6R^7{}_f Si(OR^3)_{(3-f)}$$

{wherein $R^3$ is the same as defined above; $R^6$ is an epoxy-containing organic group; $R^7$ is an alkyl group; "f" is 0 or 1}, wherein component (E) is contained in an amount of 2 to 10 mass % per sum of components (A) and (E), and wherein said component (F) is contained in an amount of from 0.01×M to 0.70×M, wherein M is a value according to the following formula:

$$M = \frac{[\text{amount of Component (B) (g)} \times \text{BET-specific surface area of Component (B) (m}^2\text{/g)}]}{[\text{minimal surface area coated with the Component (F) (m}^2\text{/g)}]}$$

and M represents a required amount of component (F) to coat 100% of the entire surface of component (B).

17. The thermally conductive silicone rubber composition of claim 16, wherein said Component (B) is an alumina powder.

18. The thermally conductive silicone rubber composition of claim 17, wherein the BET specific surface area of said Component (B) is equal to or below 5.0 m²/g.

19. The thermally conductive silicone rubber composition of claim 17, wherein said Component (B) comprises a mixture of spherical alumina powder ($B_1$) with an average particle size in the range of 1 to 30 μm (excluding 1 μm particles) and a spherical or irregular-shaped alumina powder ($B_2$) with an average particle size in the range of 0.1 to 5 μm.

* * * * *